US008978868B2

(12) United States Patent
Johnson et al.

(10) Patent No.: US 8,978,868 B2
(45) Date of Patent: Mar. 17, 2015

(54) BEZEL ASSEMBLY FOR USE WITH AN AUTOMATED TRANSACTION DEVICE

(71) Applicants: Steven Johnson, Las Vegas, NV (US); Bryan Allen Wilcutt, Las Vegas, NV (US); Omar Jorge Rivera, Las Vegas, NV (US); Connie R Masters, Henderson, NV (US); Scott A Toth, Sr., Las Vegas, NV (US); Daniel Petersen, Las Vegas, NV (US); Brian Anthony Montano, Henderson, NV (US); Dominic Mohrhardt, Las Vegas, NV (US)

(72) Inventors: Steven Johnson, Las Vegas, NV (US); Bryan Allen Wilcutt, Las Vegas, NV (US); Omar Jorge Rivera, Las Vegas, NV (US); Connie R Masters, Henderson, NV (US); Scott A Toth, Sr., Las Vegas, NV (US); Daniel Petersen, Las Vegas, NV (US); Brian Anthony Montano, Henderson, NV (US); Dominic Mohrhardt, Las Vegas, NV (US)

(73) Assignee: JCM American Corporation, Las Vegas, NV (US)

( * ) Notice: Subject to any disclaimer, the term of this patent is extended or adjusted under 35 U.S.C. 154(b) by 0 days.

(21) Appl. No.: 14/033,483

(22) Filed: Sep. 22, 2013

(65) Prior Publication Data

US 2014/0090950 A1 Apr. 3, 2014

Related U.S. Application Data

(60) Provisional application No. 61/708,632, filed on Oct. 1, 2012.

(51) Int. Cl.

| | |
|---|---|
| ***G07D 13/00*** | (2006.01) |
| ***G07F 7/04*** | (2006.01) |
| ***G07F 9/10*** | (2006.01) |
| ***G07D 11/00*** | (2006.01) |

(52) U.S. Cl.

CPC ........ *G07D 11/0018* (2013.01); *G07D 11/0051* (2013.01); *G07D 11/0036* (2013.01); *Y02B 60/50* (2013.01)

USPC .......................................... 194/344; 235/483

(58) Field of Classification Search

CPC ...... G07D 13/00; G07D 11/0018; G07F 7/00; G07F 7/04

USPC ........... 194/344; 209/534; 235/379, 380, 381, 235/483

See application file for complete search history.

(56) References Cited

U.S. PATENT DOCUMENTS

| | | | | |
|---|---|---|---|---|
| D247,828 | S | 5/1978 | Moore et al. | |
| 4,159,054 | A * | 6/1979 | Yoshida | 194/350 |
| D359,765 | S | 6/1995 | Izawa | |
| 6,712,191 | B2 | 3/2004 | Hand | |
| D488,512 | S | 4/2004 | Knobel | |
| D490,473 | S | 5/2004 | Knobel | |
| D523,482 | S | 6/2006 | Uemizo | |

(Continued)

*Primary Examiner* — Mark Beauchaine

(74) *Attorney, Agent, or Firm* — Watson Rounds; Marc D. Foodman

(57) ABSTRACT

The bezel assembly for data reception, for use with a bill validator in a financial transactional device, includes a bezel housing and a data reception assembly. The bezel housing includes a customer-facing front portion and a back plate connectable to the bill validator that is mounted within the transactional device cabinet. The front portion includes an insertion/dispensing slot for receiving currency and a projecting protrusion forward of the casing. The forward-extending protrusion accommodates at least a portion of the data reception assembly. The bezel assembly can include a wireless communication function that is communicably connectable with a mobile device via a wireless communication method, a manual entry function, a biometric reader, one or more cameras for scanning and decrypting 2D barcodes and the like, thus enhancing the overall functionality of the financial transactional device.

28 Claims, 23 Drawing Sheets

(56) References Cited

U.S. PATENT DOCUMENTS

| | | | | |
|---|---|---|---|---|
| D547,806 | S | 7/2007 | Uemizo | |
| D628,576 | S | 12/2010 | Daniel | |
| 2005/0173220 | A1 * | 8/2005 | Liu et al. | 194/206 |
| 2007/0267488 | A1 | 11/2007 | Chang | |
| 2008/0011832 | A1 | 1/2008 | Chang | |
| 2010/0155462 | A1 * | 6/2010 | Morrison et al. | 235/375 |
| 2013/0085943 | A1 | 4/2013 | Takeda et al. | |
| 2013/0130778 | A1 | 5/2013 | Anderson et al. | |
| 2013/0275314 | A1 * | 10/2013 | Bowles | 705/308 |
| 2013/0299574 | A1 * | 11/2013 | Theobald | 235/380 |
| 2014/0080578 | A1 * | 3/2014 | Nguyen | 463/25 |

* cited by examiner

BEZEL ASSEMBLY FOR USE WITH AN AUTOMATED TRANSACTION DEVICE

CROSS REFERENCE TO RELATED APPLICATION

This application claims priority to U.S. Provisional Patent Application Ser. 61/708,632, filed on Oct. 1, 2012.

FIELD OF INVENTION

This invention relates generally to a bezel for a bill validator mounted in a transactional device that is configured to receive data as well as providing an insertion slot for a bill validator.

BACKGROUND OF THE INVENTION

The insertion slot of a bezel of a bill validator provides a conspicuous location for consumers to input notes, such as currency, paper tickets, scrip, vouchers, bills, and other similar documents. Use of bill validators has provided many useful advantages, such as increasing convenience for the customer, reducing human error or fraud in currency transactions, and decreasing the need for customer service personnel.

However, it would be advantageous for a bill validator to receive additional types of transactional or informational data, such as wireless transactional data, PIN numbers, data displayed on a mobile phone display screen, and the like. Because the bezel is a prominent, readily-accessible location, it could provide an expedient location for the receipt of this additional data.

Currently, though a consumer might find it convenient to use his or her mobile device for wireless mobile payments as an alternative to paper notes at a transactional device (such as a gaming machine, vending machine, ATM, transactional kiosk, customer self-service device, payment terminals, points-of-sale, or the like), most transactional devices that are being produced or that are already deployed in the field are not operable to allow data to be received from the consumer's phone or to be input by the consumer. For example, many conventional transactional devices cannot receive a mobile payment facilitated by the phone's wireless communication capability or display capability (such as displaying an encoded barcode, matrix code, or the like). Nor are many conventional transactional devices able to allow the consumer to input data.

One approach to the problem of retrofitting a legacy transactional device is to incorporate wireless communication functionality or other additional data reception capabilities into a peripheral device already located within the transactional device cabinet, for example into a bill validator. Advantageously, bill validators are typically formed with removable consumer-facing bezels, so the potential exists to remove an old bezel and replace it with a new bezel incorporating additional data reception capabilities.

Though it would be advantageous to upgrade legacy transactional devices to enable them to receive data input by the consumer or from the consumer's phone, adding this additional data reception functionality into these legacy transactional devices may require expensive or complex modifications to the device. Retrofitting may require cutting metal cabinets and/or removing or reconfiguring interior components to provide space for one or more new data reception systems. Adding this additional data reception functionality through a bezel upgrade provides a solution that requires minimal modification to the existing cabinet.

Even in newly manufactured transactional device cabinets, where a wireless receiver may be placed in any of a variety of places in the cabinet inside, the thickness and material of the exterior of the cabinet is likely to reduce the efficiency of the wireless transmission. Therefore, providing receipt of wireless communication, through an upgraded bezel provides advantages. Some cabinet designs have addressed this problem by adding a second payment location or data input location separate from, and in addition to, the installed bill validator (such as placing a wireless receiver or other data receiver at a distance from the note receiving slot of the bill validator). However, this solution makes it harder for the consumer to determine how or where to initiate a mobile wireless transaction or how or where to input additional data.

Current attempts to incorporate wireless communication functionality into a bezel have produced a large and cumbersome bezel that is not suitable for use in the extremely limited, defined space of many transactional devices. Also, existing bezels have placed some types of wireless communication devices (such as chip & PIN card readers) in a vertical wall, which does not intuitively indicate to the consumer the location to which the mobile phone should be touched (or brought into close proximity), does not assist the consumer in positioning the mobile phone in the proper location, does not provide optimum wireless connectivity, and does not prevent the consumer from attempting to make both a paper note transaction and a wireless transaction simultaneously (which is likely to cause an error in the transactions attempted as the transactional software is not designed to accept simultaneous transactions).

Additionally, there is a need for a bezel assembly for data reception that can be installed in the many legacy or new transactional devices in which the bezel on the bill validator (which is mounted inside the transactional device cabinet) remains in the interior of the cabinet when the cabinet door opens, such as is common in gaming machine cabinets. In those transactional devices, the bezel on the bill validator must freely slide through the bill validator window. Though some wireless communication bezels are currently available, they are too large and bulky to fit in this limited space and do not meet this limitation.

Separately, conventional bill validators are configured to receive a paper bill, note, voucher, ticket or other document (herein referred to generally as a "note") as the note is fed through an insertion slot. After insertion into the insertion slot, the transport system transports the note past sensors and/or an image scanner for validating the note, and, at times, obtaining a digital image of the note, and interpreting a meaning or value of the inserted note. The current configurations of bill validators are limited to accepting only printed notes. This configuration is adapted for current paper technology, but introduces limitations when considering upcoming e-wallets and other technological advances on the horizon, wherein the data representing financial value submissions (payments, tokens, and the like) can be presented on, displayed on, or otherwise provided by non-insertable media having any of a variety of form factors, including images displayed on electronic wallets, tablets, personal data assistants, smart phones, and the like, and including electronic wireless financial transfers, and the like. It would be advantageous to allow a bill validator to receive data representing financial value submissions from non-insertable media, such as through a bezel assembly.

Accordingly, there is a need for a bezel assembly for receiving additional data to be passed to the bill validator and/or to the transactional device that houses the bill validator. This additional data may include wireless data, customer input data, and/or data stored on non-insertable media.

BRIEF SUMMARY OF THE INVENTION

The present invention is directed to a bezel assembly for data reception, which is configured for use as a front face including a note insertion slot for a bill validator in a transactional device. The bezel assembly for data reception includes a bezel housing with a forward-extending hollow tongue and a data reception assembly. The bezel assembly for data reception allows the reception of additional data that is passed to the bill validator and/or to the transactional device that houses the bill validator. The bezel assembly for data reception may be configured to allow one or multiple additional data inputs, which include the following types of data reception assemblies:

(1.) a wireless communication assembly configured for receiving wireless communications from an external device (the first three embodiments);

(2.) a manual input assembly (the fourth embodiment);

(3.) a biometric authentication assembly (the fifth embodiment); and (4.) an image recognition assembly (the sixth embodiment). The bezel assembly for data reception may include one, two, three, or all four of the data reception assemblies disclosed.

The first embodiment of the bezel assembly for data reception is a wireless communication bezel assembly including a wireless communication module and a one-part bezel housing with a forward-extending hollow tongue configured to receive at least a part of the wireless communication module. The wireless communication module is communicably connectable with a mobile device via a wireless communication method. For example, a consumer may touch (or bring into close proximity) a mobile phone enabled with near field communication (NFC) to the wireless communication module in the bezel assembly to initiate a wireless mobile payment. The first embodiment includes a one-part bezel housing having a back plate that is connectable to the bill validator that is mounted within the transactional device cabinet and having a front portion attached to the back plate. The tongue of the front portion, when the door is shut on the cabinet, extends through a validator window in the door. An insertion/dispensing slot for receiving currency extends through the front portion and through the back plate, allowing notes to be received into, or dispensed from, the bill validator. The wireless communication module is disposed at least partially in the tongue.

In accordance with the first embodiment of the present invention, the invention consists of bezel assembly for use in a transactional device having a bill validator with a note acceptance slot and having a door with a validator window, comprising:

a bezel housing comprising, in combination:

(1.) a front portion including a casing configured with an insertion/dispensing slot for receiving notes and including a hollow tongue projecting forwardly from a lower portion of the casing under the insertion/dispensing slot; wherein a top surface of the hollow tongue and an interior surface of the casing form a runway; and (2.) a back plate attached to the front portion and configured to be connectable to the transactional device; and a wireless communication module communicably connectable with a mobile device via a wireless communication protocol, the wireless communication module disposed at least partially within an interior of the hollow tongue.

In one aspect, the wireless communication module provides a short-range communication protocol utilizing Near Field Communication (NFC) (ISO/IEC 14443, ISO/IEC 18092, FeliCa). The communication protocol can alternatively utilize other wireless communication technologies, such as any of the variety of radio frequency technologies, RuBee (IEEE 1902.1), Transfer Jet (ISO/IEC 17568), Wi-Fi (IEEE 802.11), Bluetooth, ZigBee® (IEEE 802.15.4), and the like.

In another aspect, the bezel assembly includes at least one indicator light, wherein each of the at least one indicator lights is oriented to direct emitted light outward from at least one of the front portion and the hollow tongue. The indicator lights, though shown with the first embodiment, are usable with any of the embodiments disclosed.

The second embodiment includes a one-part bezel housing configured with a back plate suitable for attachment to a vending machine.

The third embodiment comprises a two-part bezel housing in which the tongue (with the interior wireless communication module) is attachable to the door of the transactional device cabinet and in which the casing and back plate are connectable to the bill validator that is mounted within the cabinet. When the door is shut, the door bezel portion and the bill validator bezel portion are juxtaposed. Variations of the embodiments are also presented.

In the fourth embodiment, the data reception assembly comprises a manual input assembly integral to the hollow tongue, the manual input assembly comprising at least one manual input device in signal communication with an input microcontroller, the at least one manual input device being positioned upon the hollow tongue at a location providing access thereto by an individual. The manual input assembly may be, for example, a keypad that allows an individual to input data, such as a PIN number, code, or other alphabetic or numeric data.

In the fifth embodiment, the data reception assembly comprises a biometric authentication assembly housed in or on the hollow tongue. The biometric authentication assembly comprises at least one biometric reader in signal communication with a biometric microcontroller; the at least one biometric reader is positioned upon the hollow tongue at a location providing access thereto by an individual which may, for example, read a fingerprint or take an eye-scan of a user.

In the sixth embodiment, the data reception assembly includes at least one visual imaging device such as, for example, a camera, which resides in or on at least one of:

a) the front portion;

b) the top surface of the hollow tongue; and c) a lower surface of the hollow tongue.

In a further aspect, the image recognition bezel assembly further comprises a video image controller assembly, the video image controller assembly comprising a microprocessor integrated into a video controller circuit, wherein the at least one camera is provided in signal communication with the video image controller assembly.

In yet another aspect, the video image controller assembly is in signal communication with one of:

a) the bill validator, b) a transactional device computer, c) a transactional device server, and d) an electronic gaming machine computer.

In another aspect, the image recognition bezel assembly for data reception further comprises a proximity sensor to identify when an object is positioned within a viewing window of any of the respective cameras. The proximity sensor can be a proximity diode, an acoustic or sonar proximity sensor, a light or Infra-Red (IR) proximity sensor, a laser proximity sensor, a Hall Effect sensor, an inductive sensor, an ambient light sensor, and the like.

An object of the bezel for wireless communication of the present invention is to integrate additional data reception with a bezel housing for usage in a transactional device.

An object of the present invention is to provide an outwardly projecting portion of the bezel housing that is configured for receiving additional data.

These and other objects, features, and advantages of the present invention will become more readily apparent from the attached drawings and from the detailed description of the preferred embodiments that follow.

BRIEF DESCRIPTION OF THE SEVERAL VIEWS OF THE DRAWINGS

The preferred embodiments of the invention will hereinafter be described in conjunction with the appended drawings, provided to illustrate and not to limit the invention, where like designations denote like elements, and in which.

Like reference numerals refer to like parts throughout the several views of the drawings.

DETAILED DESCRIPTION OF THE INVENTION

The present invention is directed toward a bezel assembly for data reception for attachment to, and in operational communication with, a financial transactional device 200 (FIGS. 8, 9, 23-30), such as an Automated Teller Machine (ATM), a gaming machine, a vending machine, a transactional kiosk, and the like. The bezel assembly for data reception allows a transactional device cabinet to be conveniently manufactured or retrofitted for the reception of additional data (beyond what is conventionally available), with this additional data then passed to the bill validator and/or to the transactional device 200 housing the bill validator. The bezel assembly for data reception includes a bezel housing with a forward-extending hollow tongue and one or multiple data reception assemblies configured to allow one or multiple additional data inputs.

Figure 10:
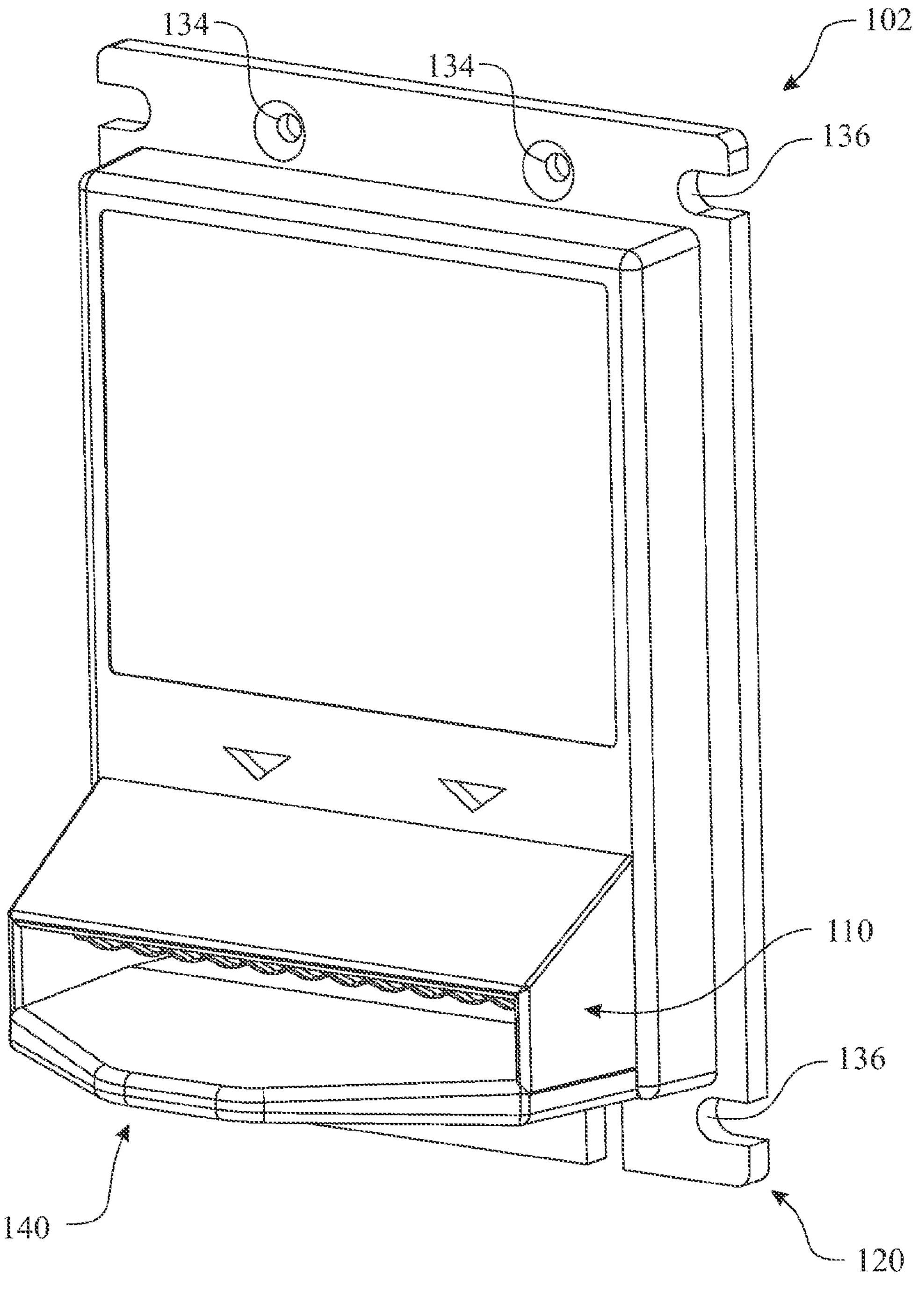
FIG. 10 presents an isometric view showing a second embodiment of the bezel assembly for data reception of the present invention configured for a vending machine environment.
Figure 11:
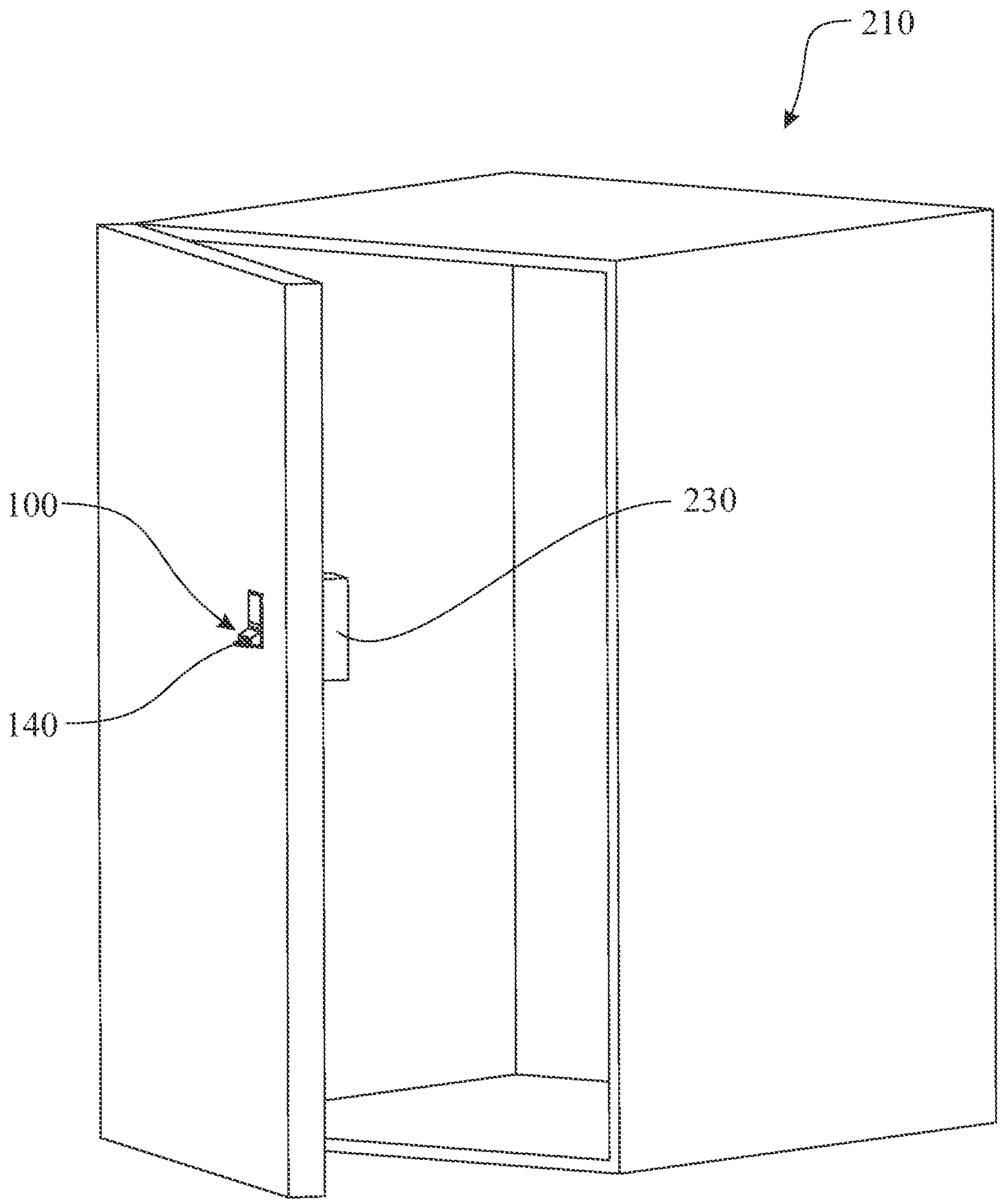
FIG. 11 presents an isometric view showing the second embodiment of the bezel assembly for data reception of the present invention disposed in a vending machine cabinet.
Figure 12:
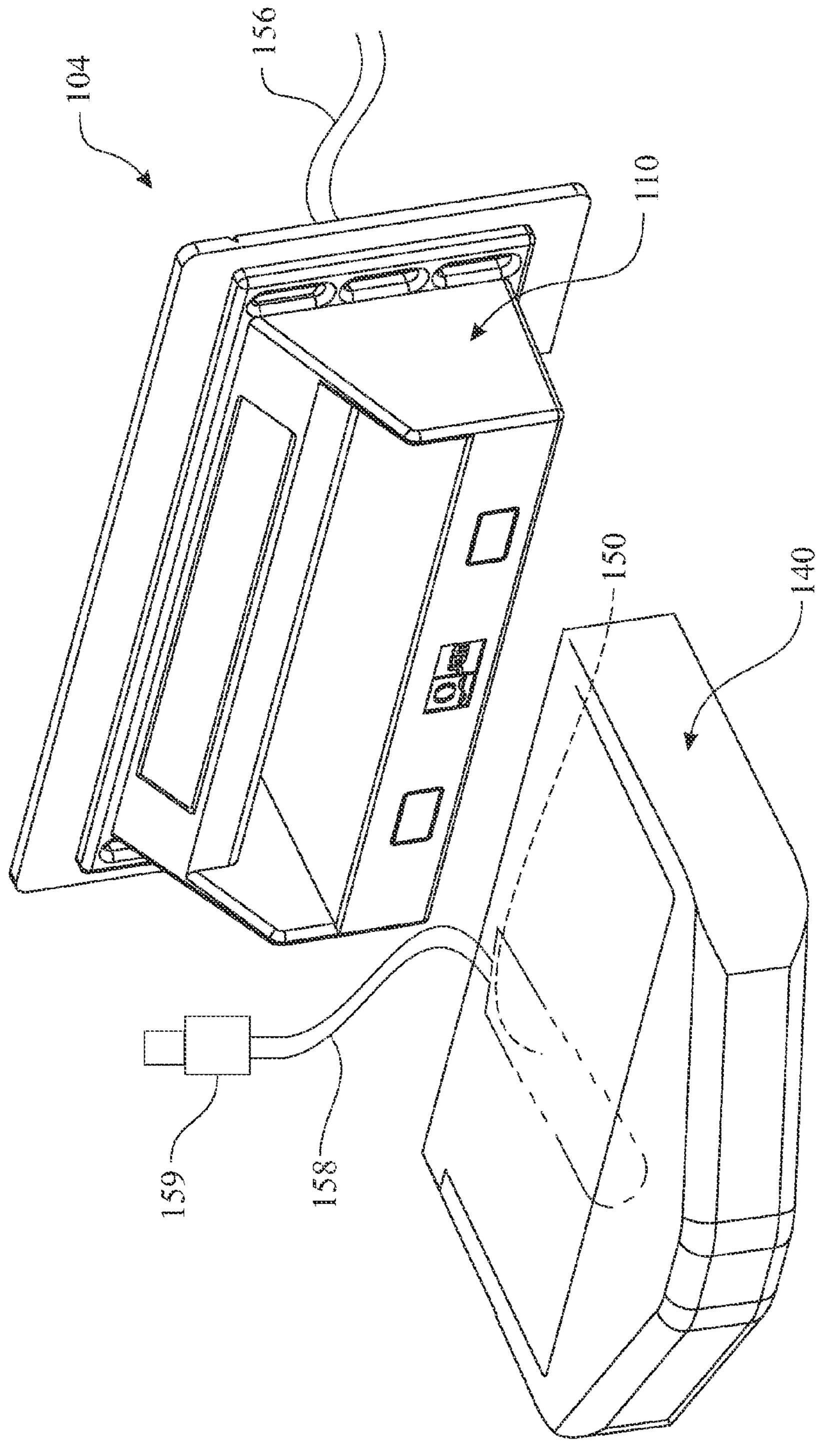
FIG. 12 presents an isometric view showing the third embodiment of the present invention illustrating a two-part wireless communication bezel.
Figure 13:
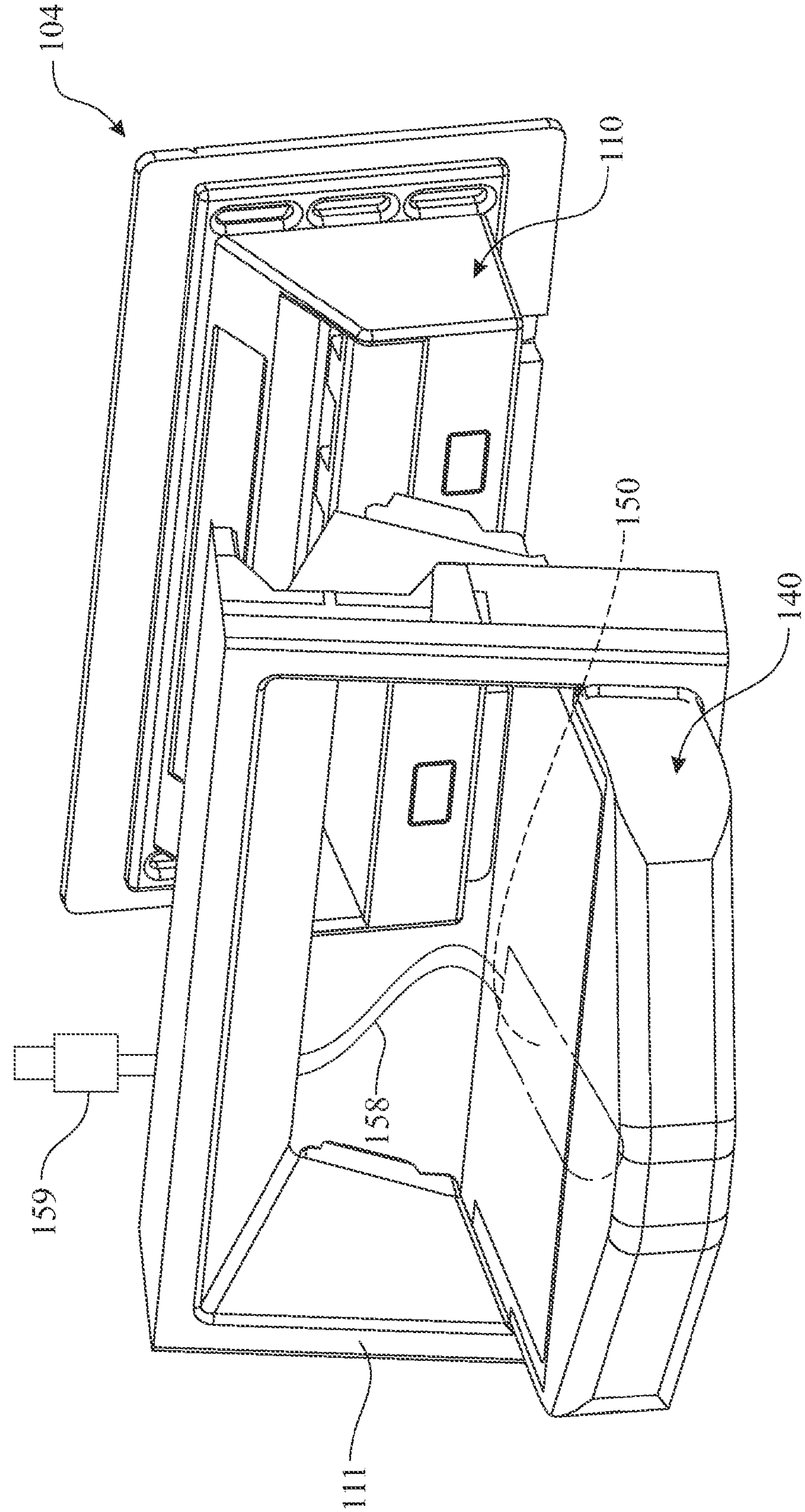
FIG. 13 presents an isometric view showing a variation in the third embodiment of the bezel assembly for data reception of the present invention illustrating a two-part wireless communication bezel.
Figure 14:
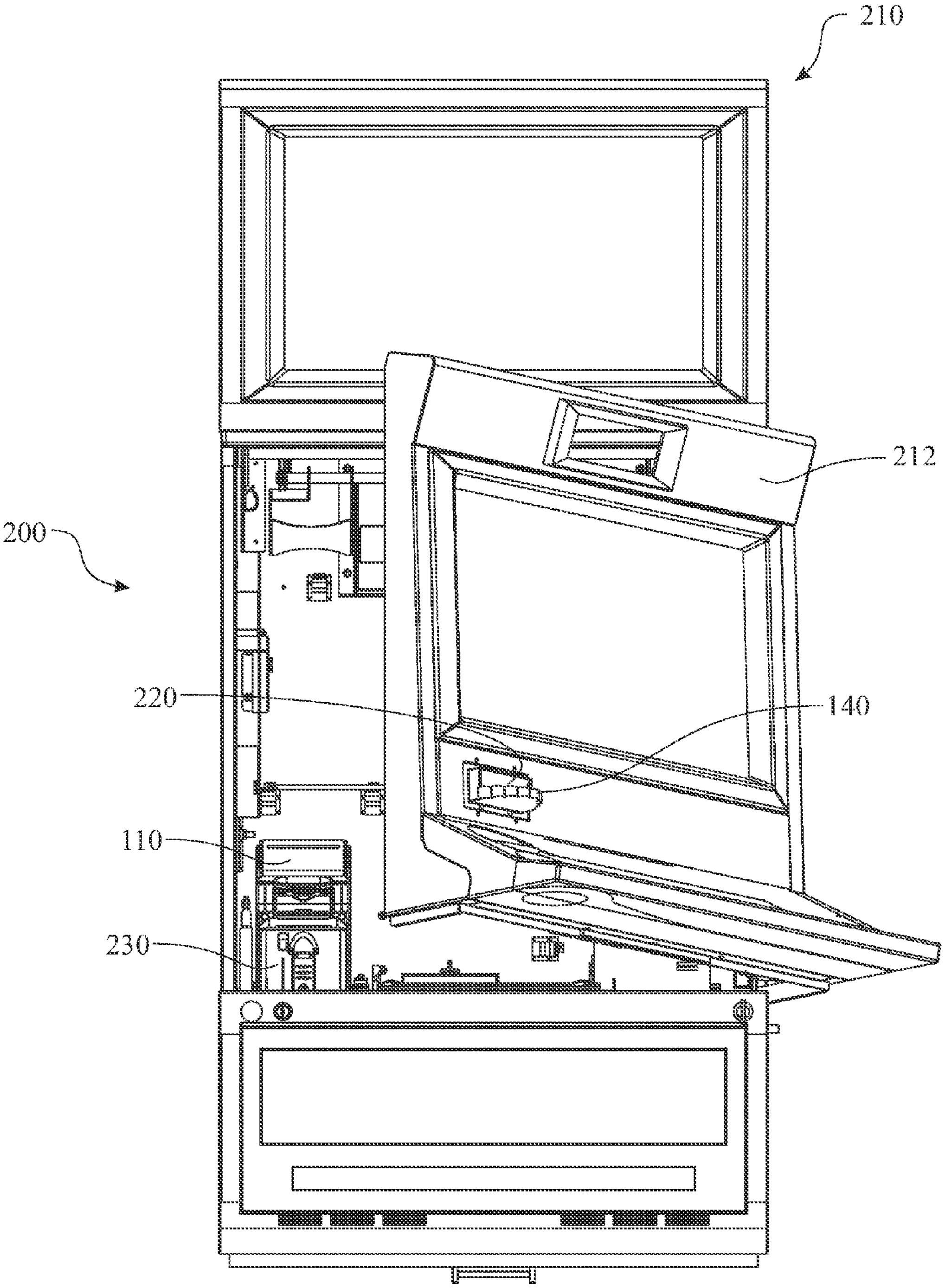
FIG. 14 presents a front view showing the third embodiment of the present invention illustrating a two-part bezel assembly for data reception in a gaming machine with the gaming machine cabinet door open.
Figure 15:
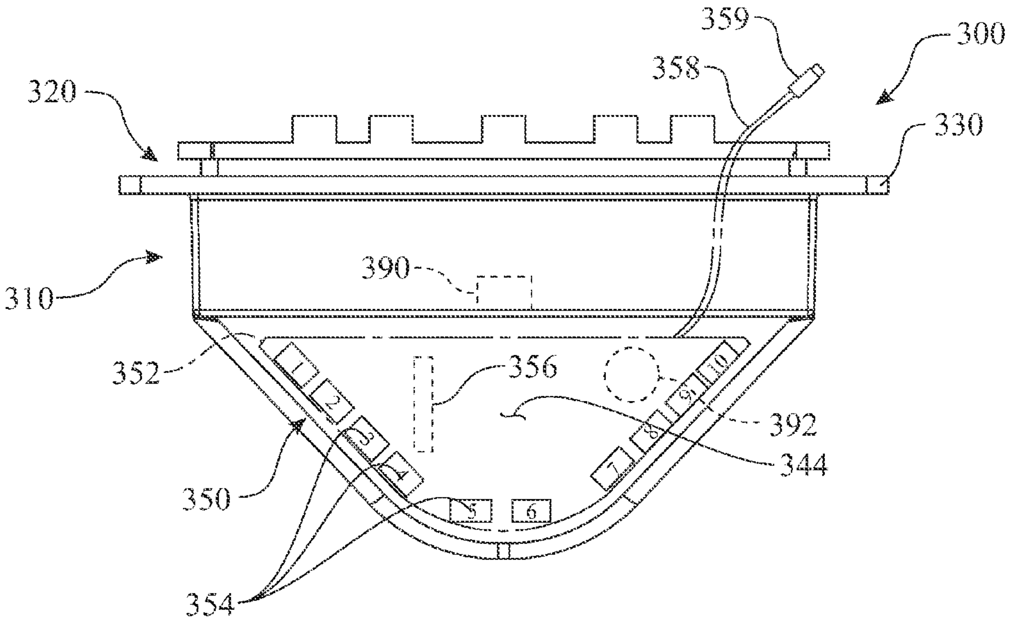
FIG. 15 presents a top view showing a fourth embodiment of the present invention illustrating a manual input assembly incorporated into the bezel housing.
Figure 16:
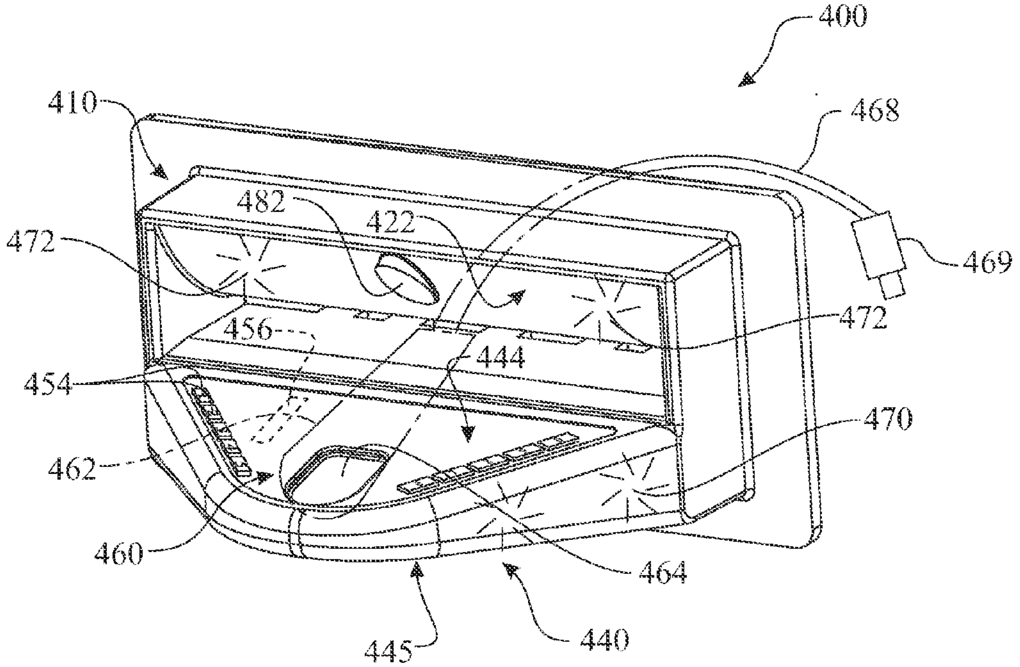
FIG. 16 presents an isometric view showing a fifth embodiment of the present invention illustrating a biometric authentication assembly incorporated into the bezel housing.

The bezel assembly for data reception may be configured to allow one or multiple additional data inputs, which include the following types of data reception assemblies:

1. a wireless communication assembly configured for receiving wireless communications from an external device (the wireless bezel assembly for data reception 100, 102, 104 of the first three embodiments, wherein embodiment one is shown in FIGS. 1-9, embodiment two is shown in FIGS. 10-11, and embodiment three is shown in FIGS. 12-14);
2. a manual input assembly (manual entry bezel assembly for data reception 300 of the fourth embodiment is shown in FIG. 15);
3. a biometric authentication assembly (biometric authentication assembly 400 of the fifth embodiment is shown in FIG. 16); and
4. an image recognition assembly (image recognition bezel assembly for data reception 500 of the sixth embodiment is shown in FIGS. 17-22).

Figure 1:
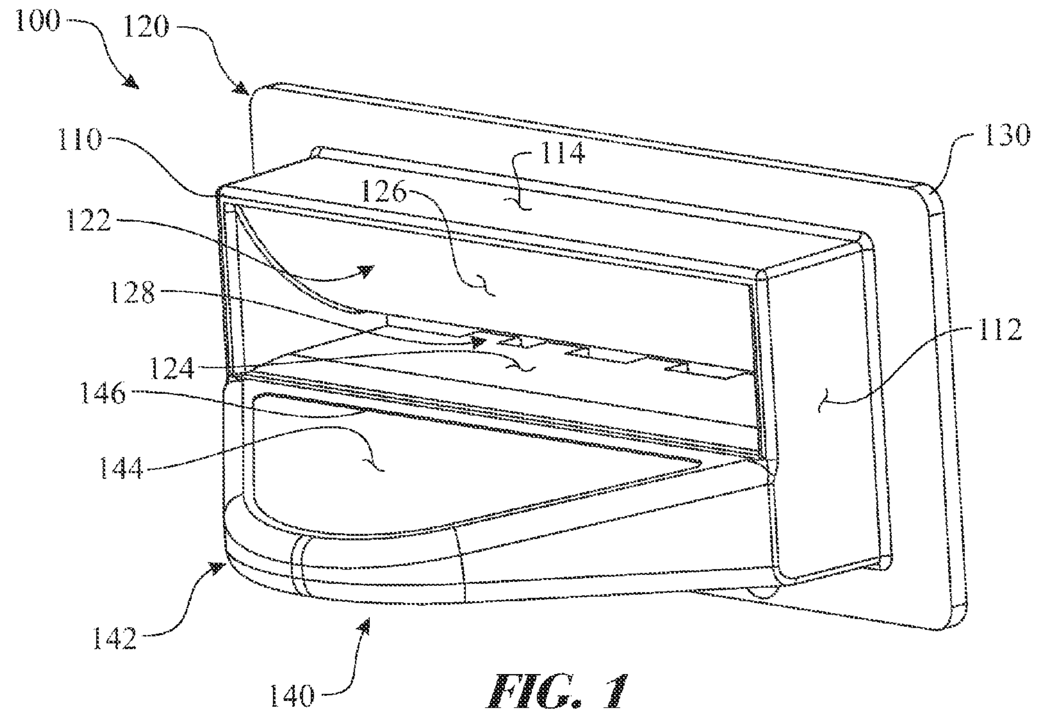
FIG. 1 presents an isometric view showing a first embodiment of the bezel assembly for data reception of the present invention (the interior wireless communication module is not shown)
Figure 2:
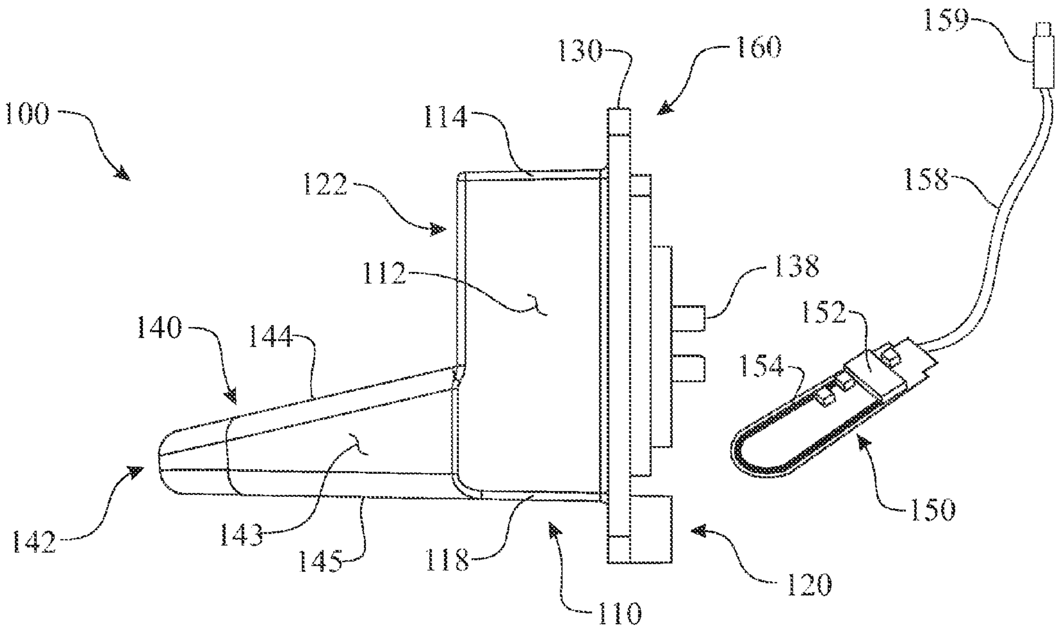
FIG. 2 presents a side view showing a first aspect of the first embodiment of the present invention wherein the top surface of the bezel tongue has a downward tilt.

The first exemplary embodiment is presented in FIGS. 1-9. In the bezel assembly for data reception 100 of the first embodiment, the data reception assembly comprises a wireless communication module 150 (FIG. 2). The wireless communication module 150 is disposed at least partially within bezel housing 160 (FIG. 2), with the bezel housing 160 configured for use as a front face including a note insertion slot for a bill validator in the transactional device 200. The wireless communication module 150 includes an antenna 154 and a communication processing device 152 (which includes a microprocessor or microcontroller and associated electronics, which may include a digital signal processor). The bezel housing 160 is configured with a forward-extending hollow tongue or protrusion 140 for at least partially enclosing the wireless communication module 150. The wireless communication module 150 is communicably connectable with a mobile device 250 (FIG. 8) via a wireless communication protocol.

Figure 8:
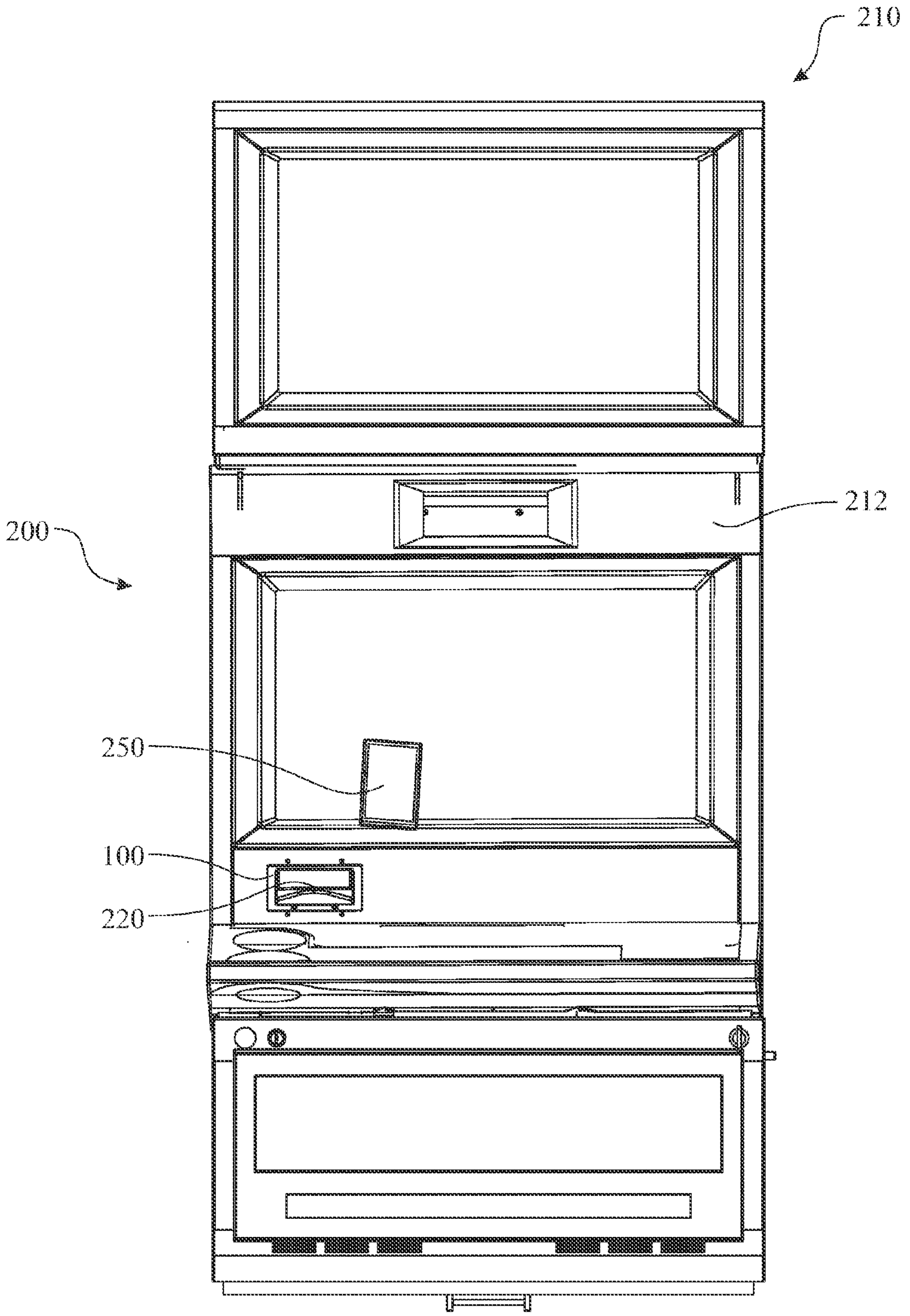
FIG. 8 presents a front view showing the first embodiment of the present invention installed in a gaming machine environment with the gaming machine cabinet door closed and the tongue extending through the validator window of the cabinet.
Figure 9:
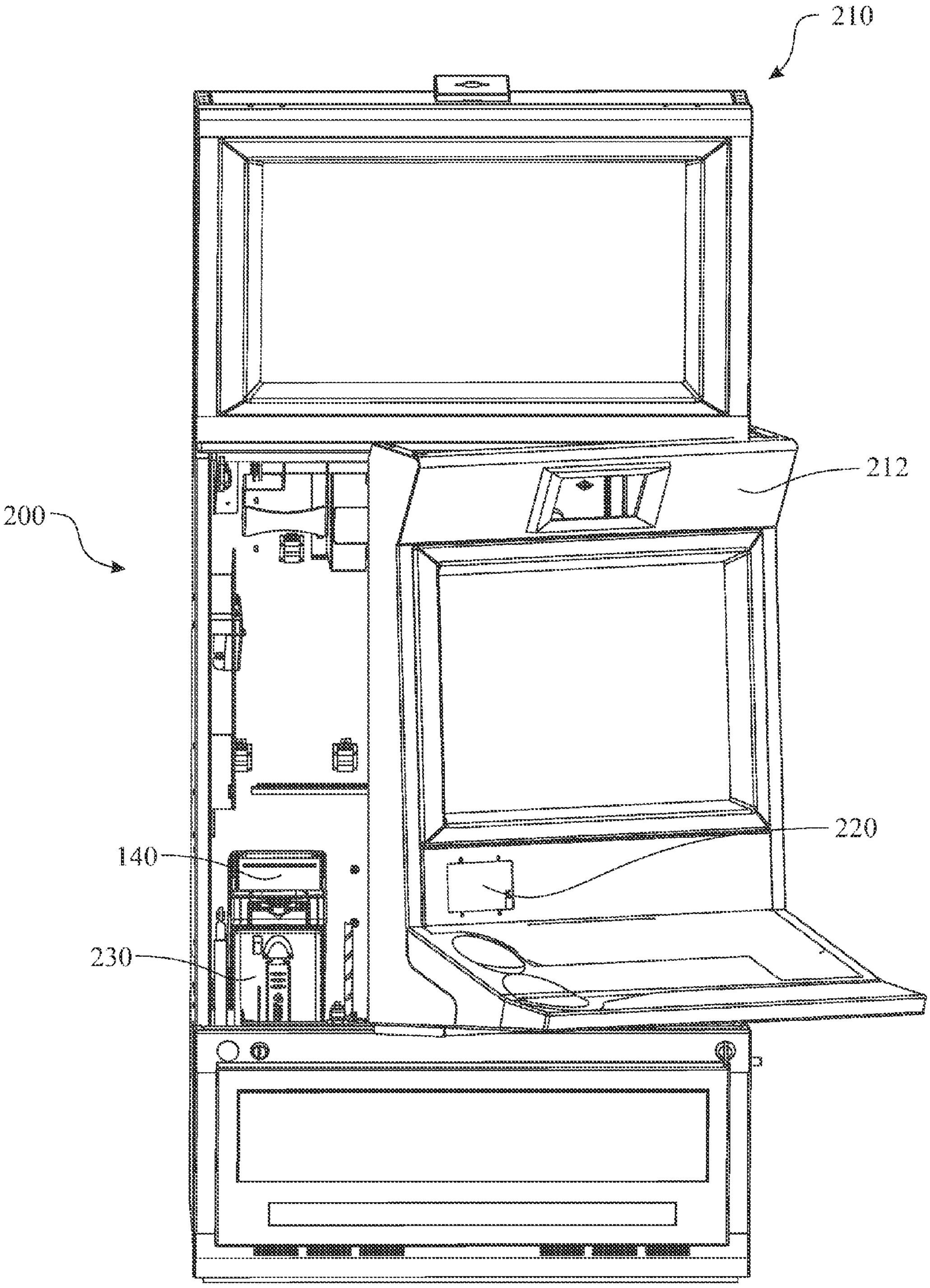
FIG. 9 presents a front view showing the first embodiment of the present invention installed in a gaming machine environment, wherein the gaming machine cabinet door is open.

Positioning of the wireless communication module 150 within the protruding tongue 140 provides several advantages. Wireless connectivity is improved between the wireless communication module 150 and a mobile device 250 by locating the wireless communication module 150 at least partially exterior of the transactional device cabinet 210 (FIGS. 8, 11, 14). The operative wireless receiving and transmitting portion and/or the reader/writer portion is disposed in the protruding tongue 140. This location allows the consumer to effortlessly bring his or her mobile device 250 in close proximity to at least a portion of the wireless communication module 150.

Additionally, both the forward-protruding structure of the tongue 140 (which serves as a natural, visual indicator for the consumer) and the intentional, close relationship between the wireless communication module and the insertion/dispensing slot (which is the conventional payment insertion location) assist the consumer in easily and intuitively determining the location to which his or her mobile device should be placed to initiate wireless communication.

Likewise, the integration of the wireless communication module 150 with the bezel housing 160 provides a single pay entry point, either for receiving notes or for an electronic transaction. The single pay entry point both reduces confusion for the consumer by providing at a single location on the transactional device. Additionally, the single pay entry point physically limits the consumer to a single payment type, thus preventing a consumer from simultaneously inserting a note while attempting a wireless communication transaction, which has a potential for causing a bill validator error.

Thus the integration of the note receiving point and wireless connectivity point provides several advantages. This is in contrast to the alternative of two payment receiving points, such as might occur when a transactional device cabinet 210 is designed or retrofitted with a wireless communication device located in a separate area of the cabinet 210.

Also, the bezel assembly for data reception provides a useful and convenient apparatus that can be retrofitted to a transactional device cabinet that was not originally configured for wireless communication. Advantageously, no modifications (i.e. cutting of additional holes) need be performed on the existing cabinet structure, as the tongue of the bezel assembly of the first and second embodiments fits through the conventional validator window 220 in the cabinet door reserved for a standard bezel and the tongue of the third embodiment is configured to replace a two-part bezel with the tongue attachable to the cabinet door.

The first exemplary embodiment of the bezel assembly for data reception 100 is adapted for an electronic gaming machine, transactional kiosk, a vending machine, an automated teller machine (ATM), or a similar transactional device 200 in which the bill validator is mounted within an enclosure or cabinet 210 and the attached bezel projects through an opening 220 in a wall or door 212. Several aspects presenting variations within the scope of the invention are also disclosed.

Figure 3:
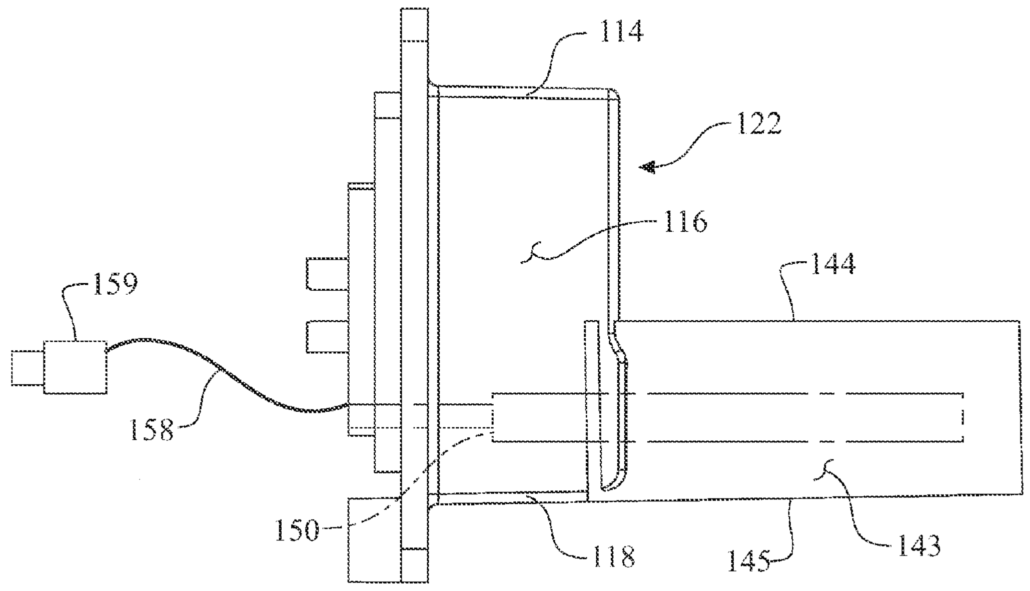
FIG. 3 presents a side view showing a second aspect of the first embodiment of the present invention wherein the top surface of the bezel tongue projects substantially horizontally from the front portion.
Figure 4:
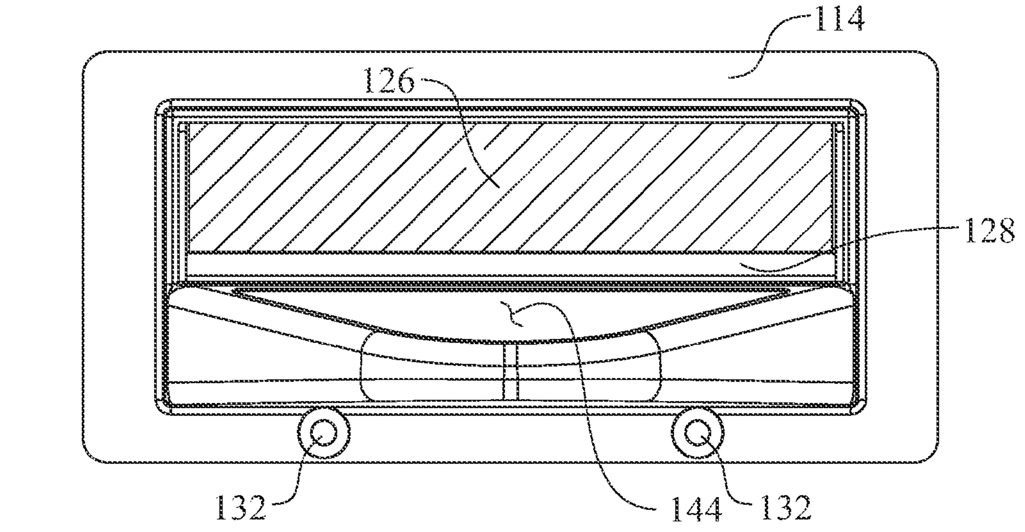
FIG. 4 presents a front view showing the first embodiment of the present invention.

The bezel assembly for data reception 100 of the first embodiment includes a wireless communication module 150 integrated with a one-part bezel housing 160 (FIGS. 1-7). The one-part bezel housing 160 is shaped with a forward-projecting tongue 140, and the forward-projecting tongue 140 is configured to receive at least a portion of the wireless communication module 150 as best illustrated in FIG. 3. For purposes of this application, the terms "integral to," "integrated in," and "integrated with" as well as any other variants of "integral" and "integrated" are interchangeable and are intended, for example, to mean but not be limited to the placement of a device being flush mounted with or in a surface, mounted on a surface, housed below a surface, or otherwise situated with, in, on or below a surface, including a surface of the protrusion or hollow tongue in any manner such that a user may effectively gain access to and use it.

The one-part bezel housing 160 includes a front portion 122 and a back portion 120. The front portion 122 of bezel housing 160 extends forward from the back plate 130 of the back portion 120. The back portion 120 is connectable to a bill validator 230 (FIG. 9) that is mounted within a transactional device cabinet 210. The front portion includes both a casing 110 (FIG. 2) with an interior insertion/dispensing slot 128 and the hollow tongue 140, which projects forwardly from the casing 110 in the area below the insertion/dispensing slot 128. The tongue 140 is configured to forwardly extend through a validator window 220 (FIGS. 8-9) in the cabinet door 212 of the transactional device cabinet 210.

The insertion/dispensing slot 128 is sized and configured for receiving notes, such as currency, paper tickets, scrip, vouchers, bills, forms, magnetic cards, identification cards, and other similar documents. When the bezel assembly for data reception 100 is attached to the bill validator 230 of the transactional device cabinet 210, the insertion/dispensing slot 128 aligns with the note acceptance slot of the bill validator 230. Therefore, notes, documents, or other insertable-media that are manually inserted into the insertion/dispensing slot 128 are received by the bill validator 230 and then mechanically transported by a transportation system into the bill validator 230. The outwardly projecting casing 110 can include features to aid in directing the notes into the bill validator. This can include a bottom interior floor 124 and a hood 126. The shapes of the opposing faces of the bottom interior floor 124 and the hood 126 are formed to guide the note into the insertion/dispensing slot 128 and subsequently into the bill validator 230. As illustrated in the exemplary embodiment, the hood 126 is preferably shaped having a convex surface.

Similarly, notes may be dispensed from the bill validator 230. For example, printed paper tickets, recycled currency, scrip, a transaction receipt, or other notes may be provided by a recycler unit of the bill validator 230, transported outwardly though the note acceptance slot of the bill validator 230, and output through the insertion/dispensing slot 128 of the bezel assembly 100 for data reception.

The outwardly projecting casing 110 includes outer casing walls 112, 114, 116, 118. The outwardly projecting casing 110 forms a frame or molding around the insertion/dispensing slot 128. The outwardly projecting casing 110 may be plain or decorative and may be illuminated or unlit. The inner portion of the outwardly projecting casing 110 defines an open throat terminating at the insertion/dispensing slot 128. The top of the open throat is preferably formed by the hood 126, which is preferably somewhat angled or convex, but may optionally be formed of a horizontal interior roof of the outwardly projecting casing 110. As previously mentioned, the hood 126 can serve to direct each inserted note towards the insertion/dispensing slot 128 and can also serve to aid the consumer in visually aligning the note. The bottom of the open throat is defined by the bottom interior floor 124 of the outwardly projecting casing 110, wherein the bottom interior floor 124 is oriented generally opposing the surface of the hood 126.

The forward-extending hollow tongue 140 is attached to, and projects forward from, a lower portion of the outwardly projecting casing 110. In the first exemplary embodiment, the outwardly projecting casing 110 and the forward-extending hollow tongue 140 are fabricated as a unitary component. A rear portion of a top surface 144 of the forward-extending hollow tongue 140 is generally aligned with the bottom interior floor 124 of the outwardly projecting casing 110. The combination of the top surface 144 of the forward-extending hollow tongue 140 and bottom interior floor 124 of the casing form an elongated runway. This elongated runway advantageously assists the consumer in positioning the note properly for insertion and in feeding the note into the interior insertion/dispensing slot 128, which in turn directs the note into the bill validator 230.

Figure 6:
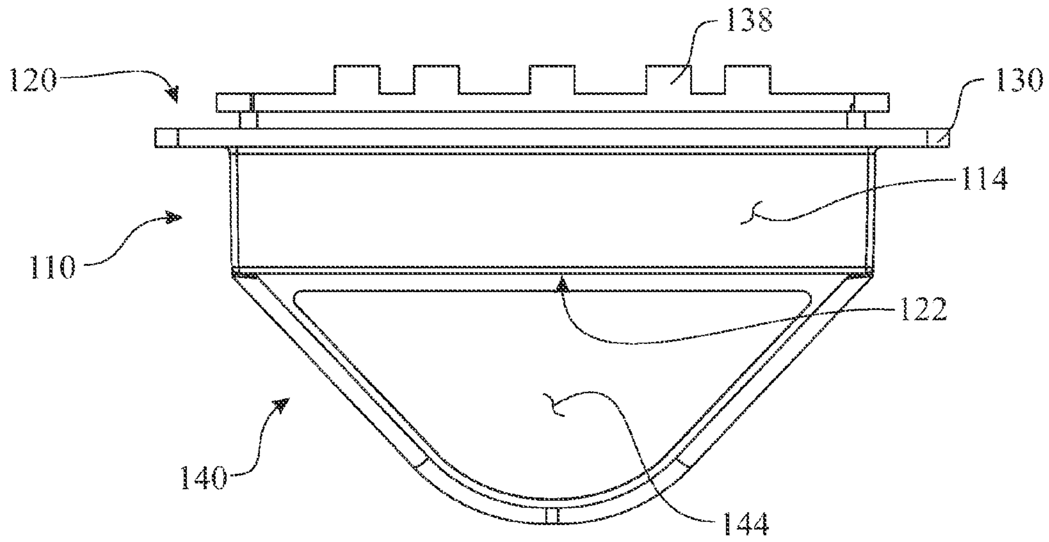
FIG. 6 presents a top view showing the first embodiment of the present invention.

As seen from the top view of FIG. 6, the forward-extending hollow tongue 140 is shown as a forward-protruding half ellipse, though the forward-extending hollow tongue 140 may be formed of varying shapes. However, in this first embodiment the forward-extending hollow tongue 140 is limited to shapes that will allow the opening and closing of the cabinet door 212 without engagement of the forward-extending hollow tongue 140. As particular cabinets 210 may vary, the specific shape of forward-extending hollow tongue 140 may also be varied to accommodate differing door shapes, door openings, door validator window sizes and placements, and the like. For example, the tongue 140 may be formed as a rounded right angle, as a semi-circle, half of a hexagon, or other similar shape having a wider portion joined to the lower portion of the casing 110 and having a narrower portion projecting forward so as to allow clearance for the door. Additionally, shapes that only narrow on one side (the side on which the door opens) may be used, such as a quarter circle. The tongue 140 may optionally include an inset area 146 configured to receive a label, such as an indicia-carrying sticker, silk-screened insert, printed vinyl decal, etc.

Additionally, it is understood that the angles of the top plane and bottom plane can be varied. For example, in FIG. 2 the plane of the tongue top surface 144 forms an acute angle with the plane of the bottom surface 145. However, in FIG. 3 the plane of the tongue top surface 144 is generally parallel to the plane of the bottom surface 145.

The back portion 120 of bezel housing 160 includes a back plate 130 and includes one or more elements or features to attach the bezel assembly for data reception 100 to the front of the bill validator 230. The attachment devices are compatible with the correlating attachment devices of the particular bill validator 230 to which the bezel assembly 100 is to be attached, and may be customized for each type of validator 230. For example, the attachment device may include one set of holes 132 (FIG. 4), two sets of holes 132, 134 (FIG. 5), slidingly engageable brackets, or other standard attachment devices 138. It is understood by those skilled in the art that the attachment device can be selected from any known attachment devices or attachment interfaces that would be suitable for the installation thereof.

The wireless communication module 150 is operational to communicate with a mobile device 250 using any wireless communication protocol currently known or a protocol that becomes known by those skilled in the art. Details of an exemplary wireless communication module 150 are presented in FIGS. 12 and 13. For example, one protocol that is commonly used for mobile wireless transactions is Near Field Communication (NFC) (ISO/IEC 14443, ISO/IEC 18092, FeliCa), but the wireless communication used is not limited to NFC, as other wireless communication technologies are within the scope of the invention, such as any of the variety of radio frequency technologies, RuBee (IEEE 1902.1), Transfer Jet (ISO/IEC 17568), Wi-Fi (IEEE 802.11), Bluetooth, ZigBee® (IEEE 802.15.4), or the like. The communication between the wireless communication module 150 and mobile device 250 can use any conventional technical architecture mode, such as reader/writer mode, peer-to-peer mode, or card emulation mode and can use any conventional communication operating mode such as passive communication mode (in which the wireless communication module 150 is an initiator and provides a carrier electromagnetic field with the NFC chip of the target mobile device 250 answering by modulating the existing field) or active communication mode (in which both the wireless communication module 150 and the NFC chip of the target mobile device 250 communicate by alternately generating their own carrier fields). Further, the communication is not limited to wireless mobile transactions, but may include connecting the mobile device 250 with another device or include digital content exchange and other various data exchange communications, such as identification of the user for consumer rewards.

The wireless communication module 150 is sized and configured to fit at least substantially within the bezel housing 160, with the reader/writer portion of the wireless communication module 150 disposed within the hollow tongue 140. Power is provided to the wireless communication module 150 from the transactional device or a peripheral accessory within the transactional device cabinet 210 by way of a cable 158 or any other suitable electrically conductive component. The cable 158 may be designed with appropriate connectors 159 to correspond to connectors within the transactional device or peripheral device. The wireless communication module 150 is operational to transmit data through electrical communication (such as through the cable 158) or by using any conventional wireless communication.

The material, design, and finish of the bezel assembly for data reception 100 may be varied based on considerations such as aesthetics, specifications of the transactional device cabinet 210, environment of use, and other factors. To illustrate this possible customization and variability, several exemplary variations in design of the first embodiment are provided in FIGS. 2, 3, and 7.

In the first aspect, as illustrated in FIG. 2, the top surface 144 of the forward-extending hollow tongue 140 is configured with a slight downward tilt; the plane of the top surface 144 forms an acute angle with the plane of the bottom surface 145. This downward tilt deters the customer from resting the mobile device 250 (FIG. 8) on the forward-extending hollow tongue 140, preventing the customer from inadvertently laying the mobile device 250 on the forward-extending hollow tongue 140 and forgetting the mobile device. The narrowing of the height of the forward-extending hollow tongue 140 as it projects outward also allows the reader/writer portion of the wireless communication module 150 to be positioned very near the outside surface of the forward-extending hollow tongue 140, thereby potentially optimizing and increasing the wireless connectivity. Optionally, the top surface 144 of the tongue 140 may be configured with a data input device (such as a key pad or touch pad, as shown in FIG. 15) allowing the consumer to manually input data, such as an identification or security number.

In the second aspect, as illustrated in FIG. 3, the top surface 144 of the forward-extending hollow tongue 140 is substantially parallel to the bottom surface 145 of the forward-extending hollow tongue 140, resulting in a more rectangular shaped tongue 140 providing more interior space. To meet the requirements of some situations, the increased interior space may be preferable. For instance, a larger number of lighting elements 170, 172 (FIG. 7) could be disposed within the larger open interior.

Figure 7:
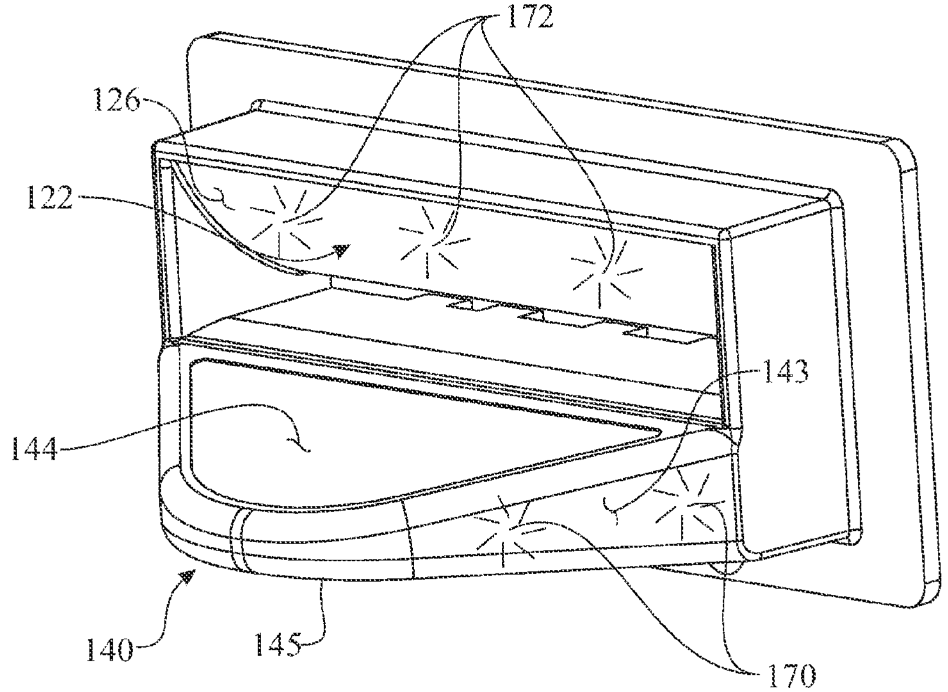
FIG. 7 presents an isometric view showing illuminated indicator lights illustrated with the first embodiment, but that may be used with any of the embodiments of the present invention.

Referring now to FIG. 7, the front portion 122 of the bezel assembly for data reception 100 includes one or more illuminated indicator lights 170, 172, which may be integrated into any of the embodiments of the present invention, though the indicator lights 170, 172 are shown with the bezel of the first embodiment. The indicator lights 170, 172 are located to be visible to the consumer who is using the bezel assembly for data reception 100 and are configured to provide a signal or to convey additional information to the consumer about the transactional device or the wireless communication, to convey data concerning the bezel assembly 100 to technicians, to display an aesthetically pleasing graphic, and the like. The indicator lights may include base lighting elements 170 and/or hood lighting elements 172. The base lighting elements 170 are installed within the forward-extending hollow tongue 140. The base lighting elements 170 can be installed in any portion of the forward-extending hollow tongue 140, including the tongue sidewall 143 (as shown), the tongue top surface 144 and/or the tongue bottom surface 145. The hood lighting elements 172 are preferably assembled to the hood 126.

The type of lights used and the method of integrating the indicator lights 170, 172 into the front portion 122 may vary based on considerations such as aesthetics, preferences of the manufacturer of the transactional device cabinet 210, durability, information to be conveyed to the consumer, and other factors. The indicator lights 170, 172 may be inset within the walls of the front portion 122 with the tops of the indicator light flush with the outer surface of the wall; they may protrude slightly above the outer surface of the wall; or they may be enclosed within the front portion 122 with only the glow viewable through the material of the front portion 122. Indicator lights 170, 172 that are disposed under the walls are advantageously less susceptible to accidental damage or vandalism.

The indicator lights 170, 172 may be disposed in various areas of the front portion 122. Two sets of indicator lights 170, 172 are shown in FIG. 7, one set of hood lighting elements 172 and one set of base lighting elements 170 behind the tongue sidewall 143. The indicator lights 170, 172 may be of a single color or multiple colors, as preferred to provide the desired indication or indications to the consumer. Single color indicator lights 170, 172 may utilize single color Light Emitting Diodes (LED's). Multiple color indicator lights 170, 172 may utilize a plurality of single color Light Emitting Diodes (LED's) or a single multicolor Light Emitting Diodes (LED).

In one example, the indicator lights 170, 172 are LED lights electrically connected to an LED board (or multiple LED boards). In the idle state the LED lights are lit to a solid green color. When the consumer brings the mobile device 250 near the wireless communication module 150 of the bezel assembly 100, communication is initiated. While the mobile device 250 and the communication module 150 are communicating, the communication module 150 outputs a signal, such as a five-volt (5V) signal, to the LED board. The LED board receives the signal and actuates the LED lights to flash blue while the communication is in progress. Upon completion of the communication, the communication module 150 ceases to output the signal. Upon cessation of the receipt of the signal, the LED board returns the LED lights back to the solid green color, indicating an idle state. If a transaction is successful, a positive response may be relayed to the customer. A signal may be sent to the LED board to actuate the LED lights to flash a different color, such as green, to provide this indication to the customer that the transaction has been credited or the information properly conveyed.

Figure 5:
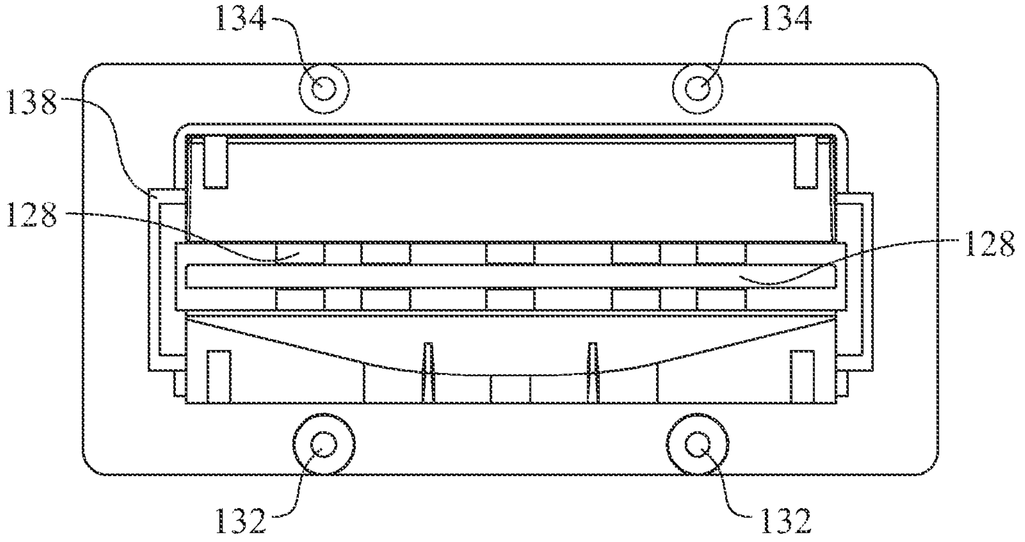
FIG. 5 presents a back view showing the first embodiment of the present invention.

The bezel assembly for data reception 100 is configured for easy installation onto the bill validator 230 that is mounted, or will be mounted, into a transactional device. To install the bezel assembly for data reception 100 of the first embodiment, power is provided to the wireless communication module 150 by attaching cable 158 to a power supply within cabinet 210. (If lighting elements 170, 172 are included, power will also be supplied to them. A power regulator or voltage divider can be included in an illumination circuit to adjust the power from a power source to the desired power for illuminating the lighting elements 170, 172.) The bezel assembly 100 is positioned at the front of bill validator 230, with the engageable devices 138 engaged with the correlating receiving attachment devices of the particular bill validator 230 to which the bezel assembly 100 is to be attached. Screws, bolts, or other fasteners may be inserted through holes 132 (FIGS. 4, 5) and/or 134 (FIG. 5). For example, if the bill validator 230 is affixed in an upward stacking position, holes 132 may be utilized. However, if the bill validator 230 is affixed in a downward stacking position, using holes 134 (FIG. 5) will allow the bezel assembly 100 to be inverted with the tongue 140 remaining below the insertion/dispensing slot 128.

The cabinet door 212 can then be shut with the validator window 220 (FIGS. 8-9) in the cabinet door 212 fitting over the back plate 130 (which is then substantially hidden behind the door 212) and with the front portion 142 of the hollow tongue 140 containing the wireless communication module 150 and the respective front portion 122 of the casing 110 protruding through the validator window 220.

The bezel assembly for data reception 100 can be used by a consumer to perform transactions in two separate ways. The bezel assembly for data reception 100 allows transactions involving: (1) physical notes to be inserted through bezel 160 into bill validator 230, and also (2) for handling mobile transactions through communication module 150.

In the first type of usage, a consumer can insert one or more notes into the insertion/dispensing slot 128 of the bill validator 230 to credit an account, to purchase goods, or to wager an amount in a gaming machine, or the consumer can receive one or more notes dispensed by the bill validator 230 through the insertion/dispensing slot 128. In the second usage, the consumer has a mobile device 250 that is operable to communicate with the wireless communication module 150. The consumer can touch the mobile device 250 to or locate it near tongue 140 initiating communication with the wireless communication module 150. The communication can complete a transfer of funds, such as an ewallet or mobile wireless transaction, or the communication may be a transfer of information, such as communicating a consumer reward card number, player identification number, or mobile device identification number to the transaction device.

The bezel housing 160 is preferably formed unitarily of a plastic material (i.e. a moldable synthetic or semi-synthetic thermoplastic or thermosetting polymer). For example, the bezel housing 160 may be formed of unitarily molded polycarbonate.

In the second exemplary embodiment of the bezel assembly for data reception 102, as illustrated in FIGS. 10 and 11, the data reception assembly comprises a wireless communication module 150, as in the first embodiment, but includes an adaptable bezel housing 160 that is used with any of the wide variety of conventional, pre-configured transactional device cabinets 210, but is particularly physically configured for use in a vending machine cabinet 210. The back portion 120 includes a multitude of mechanical attaching features, including a series of holes 134 and a series of notches or slots 136. The holes 134 and notches or slots 136 can be placed about the periphery of the back portion 120. The locations of the holes 134 and notches or slots 136 are strategically placed to accommodate a wide variety of standard mounting patterns of targeted applications.

Typically the validator window 220 reserved for a standard bezel is larger in a standard vending machine than the validator window 220 in a gaming machine, thus the back plate 130 of the second embodiment is larger to fit the validator window of the particular vending machine. Additionally, the attachment device of the bezel assembly for data reception 102 of the second embodiment is designed to be compatible with the correlating attachment means of the standard vending machine. For example, the notches 136 may be provided for attaching the bezel assembly 102 via studs and hex nuts to the inside of the cabinet of the standard vending machine. As in the first embodiment, the holes 134 are provided for attaching the bezel assembly 102 to the front of the validator 230. Optionally, mounting brackets and mounting adapter plates of various types can be provided with the bezel assembly for data reception 102 to accommodate other shapes and configurations of validator windows.

In the third exemplary embodiment of the bezel assembly for data reception 104, as illustrated in FIGS. 12-14, the data reception assembly comprises a wireless communication module 150, as in the first two embodiments, but exemplifies another of the variations in the bezel housing 160 that are within the scope of the invention.

In the third embodiment, the wireless communication module 150 functions in a similar manner to the first and second exemplary embodiments. However, the bezel housing 160 is formed in two parts, with a first segment, casing 110, attached to the bill validator 230 and with a second segment, tongue 140, attached to the transactional device door 212.

In this third embodiment, the tongue 140 is configured for permanent attachment to an area of the door 212 within or extending forward of the validator window 220. The tongue 140 may have a generally rectangular rearward portion and a forward-extending portion, as shown in FIG. 12. As the bezel housing 160 is configured as two separate sections, both sections can be independently powered and can have independent data communication. For instance, power and/or data communication can be supplied to the wireless communication module 150 within the tongue 140 by the cord 158. And power and/or data communication can be supplied to the back section of the two-part bezel housing separately by the cord 156, if needed. It is understood that power can be provided to the tongue 140 by a portable power source, such as a rechargeable battery.

The two part design provides a manufacturing and integration advantage, where since the hollow tongue 140 and the casing 110 are fabricated of separate components, the two-part design enabling assembly of one hollow tongue 140 having one design to any of a multitude of different shaped casings 110. This enables adaptation of the bezel assembly for data reception 100 to a multitude of different transactional devices 200, while minimizing manufacturing and inventory costs.

A variation in the design and shape of the tongue 140 is presented in FIG. 13, wherein the exemplary tongue 140 includes a tongue mounting frame 111 that serves to edge the validator window 220 for a finished look.

The bezel assembly for data reception 104 is presented in FIG. 14 having the back casing 110 section mounted on a bill validator 230 and with the front tongue 140 section attached to the door 212 in the validator window 220. When the door 212 is closed, the top surface 144 of the tongue 140 generally aligns with the bottom surface of the casing 110 and the bottom interior floor 124 of the casing 110 to form a runway for receiving notes into the insertion/dispensing slot 128 and into the note acceptance slot of the bill validator 230.

Additionally, FIG. 14 illustrates that the tongue 140 of the bezel assembly for data reception 104 of the present invention need not be limited to streamlined shapes. More elaborate designs can be employed, such as to catch the attention of the consumer, to enhance a theme, to implement a marketing strategy, and the like. For example, the flower-shaped tongue 140 illustrated in FIG. 14 might be appropriate for use on a transactional device in a botanical garden.

In the fourth exemplary embodiment of the bezel assembly for data reception 300, the manual entry bezel assembly, as illustrated in FIG. 15, the data reception assembly comprises a manual input assembly 350. The manual input assembly 350 includes manual input device 354 and an input microcontroller 352. The manual input assembly 350 is operable to allow a consumer using the bezel assembly for data reception 300 to input data, for example a personal identification number, a transaction amount, a manual acceptance or confirmation of presented information, or other user response. The manual input device 354 can be integral to any suitable area of the bezel housing 310, and preferably with the tongue top surface 344. The manual input device 354 can be illuminated using any known illuminating design, including Light Emitting Diodes (LED's), electroluminescent backlighting, incandescent lighting, gaseous illuminating devices (such as halogen lights), and the like.

The manual input device 354 may be configured as engageable mechanical switches, capacitive switches, a keypad, a tactile touchpad, a touchscreen, or the like. In one example, the manual input device 354 has a plastic insert with an indicator (such as a number and/or text) printed or screened upon it. The consumer can input data by touching (or closely approaching) the plastic insert, with the input microcontroller 352 detecting the touch and interpreting it as a key press for that location or reference. In a second example, the manual input device 354 comprises a touchscreen operable to receive input by touch. The touchscreen may extend generally over the entire top surface 144 of the forward-extending hollow tongue 140 or may cover all or part of inset area 146.

The input microcontroller 352 may receive power from, and be in signal communication with, the transactional device or an accessory within the transactional device cabinets 210, such as through the cable 358 and the respective connector 359 or a short-range wireless communication module 356. Optionally, the manual input assembly 350 may be disposed within the tongue 340 of the bezel housing 310, without the wireless communication module 350; therefore the bezel would lack wireless connectivity, but allow convenient design or retrofitting of a transactional device with manual input for other applications. The manual entry bezel assembly for data reception 300 may also be used with any of the other embodiments of the present invention. The short-range wireless communication module 356 of the manual entry bezel assembly for data reception 300 includes a wireless communication circuit 356 comprising circuitry and associated operational instructions to wirelessly communicate with at least one of a mobile device 250 and a portable computing device.

The bezel assembly for data reception 300 can be configured in accordance with any of the previously described configurations, including a casing 310 and mating backing portion 320 as illustrated, having any suitably shaped forward-extending hollow tongue 340, having a unitary constructed tongue and front bezel (as illustrated in FIGS. 1 through 7), having separately constructed tongue and front bezel (as illustrated in FIG. 12), or in accordance with any other embodiment presented herein.

The bezel assembly for data reception 300 can include at least one proximity sensor 390 to identify when a consumer approaches an area of the bezel assembly for data reception 300 containing the manual input device 354.

The bezel assembly for data reception 300 can be enhanced by integrating a camera (such as a hood located camera 582, a tongue upper surface mounted camera 584, and/or a tongue lower surface mounted camera 586 as illustrated in FIGS. 17-22) for recording video or still images of activity within a viewing window of the camera 582, 584, 586. The recorded video can be utilized for any suitable purpose, including those described below. The integrated camera can be any digital image recognition and/or recording device. The integrated camera can include an audio recording system.

A digital clock 392 can be integrated into the manual input assembly 350, enabling clocking functions. The digital clock 392 can be included within the input microcontroller 352 or provided as a separate element. The digital clock 392 can be utilized to monitor time between consumer inputs.

In the fifth exemplary embodiment of the bezel assembly for data reception 400, the biometric registering bezel assembly, as illustrated in FIG. 16, the data reception assembly comprises a biometric authentication assembly 460 integral to a forward-extending hollow tongue or protrusion 440 of a bezel housing 410. The bezel housing 410 can be designed as a one piece configuration or as a two piece configuration (including a front member and a backing member). The forward-extending hollow tongue 440 and the can be fabricated as a unitary element of the bezel housing 410 (as illustrated in FIGS. 1, 2, and 7) or as a separate member, subsequently assembled to the bezel housing 410 (as illustrated in FIG. 12).

The biometric authentication assembly 460 includes a biometric receiver 464 (such as, for example, a fingerprint reader, an iris reader, a retinal scanner, a facial recognition system, speech recognition system, or any other biometric receiving interface), a biometric microcontroller 462, and appropriate power and data connections (such as cord 468 and connector 469). The biometric authentication assembly 460 is operable to allow a consumer using the bezel assembly for data reception 400 to identify him or herself through the reading of this unique biometric information. The biometric receiver 464 may be inset within the protruding portion of the tongue 440; particularly the outward edge of the tongue is conveniently accessible to the consumer. For example, in the case of a fingerprint reader, when the consumer touches the biometric receiver 464, the biometric microcontroller 462 receives and processes the reading. The biometric microcontroller 462 preferably outputs the data to the transactional device processor or to a central processing system where the fingerprint read can be compared to templates stored in memory. Optionally, the biometric controller 462 may output the data to a peripheral device or hub disposed within the transactional device for data comparison purposes. This consumer authentication can be used to assure that only a pre-selected group of people can use a transactional device or that a pre-selected group of people is excluded from using the transactional device. For instance, a company could allow purchases of food from a vending machine without cash, based only on the employee's fingerprint; with the cost of the food added to the employee's tab or account for later reconciliation and payment. Optionally, the biometric authentication assembly 460 may be disposed within the tongue 140, without the wireless communication module 150; therefore the bezel would lack wireless connectivity, but allow convenient design or retrofitting of a transactional device with biometric authentication for other applications. Additionally, the biometric authentication assembly 460 may be utilized with any of the other embodiments of the present invention.

The bezel assembly for data reception 400 can be enhanced by integrating optional additional features. A first optional feature is a short-range wireless communication module 450. The short-range wireless communication module 450 includes the same elements and same benefits as the short-range wireless communication module 150 previously described herein. The combination of the biometric authentication assembly 460 and the short-range wireless communication module 450 enables additional benefits to the consumer and the service provider. The combination of the biometric authentication assembly 460 and the short-range wireless communication module 450 can be used to enhance security, ensuring the consumer is the registered party with the wireless communicating device 250 by utilizing the biometric authentication assembly 460 to authenticate the proper ownership in conjunction with any wireless communication between the bezel assembly for data reception 400 and the wireless communicating device 250.

A second optional feature is a manual input assembly, represented by a series of manual input devices 454 that can be integral to the bezel assembly for data reception 400 as previously described in the integrated in the bezel assembly for data reception 300. The manual input assembly would comprise the same elements as the manual input assembly 350 and provide the consumer with the same benefits as previously presented.

A third optional feature introduces image recognition. The image recognition can be accomplished by integrating one or more cameras 482 into the bezel assembly for data reception 400. The one or more cameras 482 can be integrated into a casing front portion 422 (as illustrated), into a tongue top surface 444, and/or into a tongue bottom surface 445. Details of a camera and respective components integrated into the casing front portion 422 are described by the hood located camera 582 introduced in FIG. 17. Details of a camera and respective components integral to the tongue top surface 444 are described by the tongue upper surface mounted camera 584 introduced in FIG. 17. Details of a camera and respective components integral to the tongue bottom surface 445 are described by the tongue bottom surface mounted camera 586 introduced in FIG. 22.

A fourth optional feature introduces an illuminating indicator system comprising at least one indicator light 470, 472. The at least one indicator light 470, 472 would be similar in scope and implementation as the indicator lights 170, 172 introduced in FIG. 7.

In the sixth exemplary embodiment of the bezel assembly for data reception 500, as illustrated in FIGS. 17-22, the data reception assembly comprises an image recognition assembly including at least one camera 582, 584, 586 and a video image controller assembly 572. The at least one camera 582, 584, 586 can be a still camera, a video camera or both. The image recognition bezel assembly for data reception 500 may be used alone or in combination with the wireless communication bezel assembly of the first three embodiments, with the manual input assembly of the fourth embodiment, and/or with the biometric authentication assembly of the fifth embodiment. Like features of the image recognition bezel assembly for data reception 500 and the bezel assembly for data reception 100 of the other embodiments are numbered the same except preceded by the numeral '5', with the unique elements described herein.

Like the previously described housings 110, 301, the bezel housing 510 can be designed as a one piece configuration or as a two piece configuration (including a front member and a backing member). The forward-extending hollow tongue 540 and the can be fabricated as a unitary element of the bezel housing 510 (as illustrated in FIGS. 1, 2, and 7) or as a separate member, subsequently assembled to the bezel housing 510 (as illustrated in FIG. 12).

The exemplary image recognition bezel assembly for data reception 500 includes at least one externally located camera 582, 584, 586 for obtaining an image provided on "non-insertable media." Non-insertable media includes an object having a thickness that exceeds the allowable thickness of items capable of passing through the interior insertion/dispensing slot 528 and also includes an object that a consumer may feel uncomfortable inserting into a bill validator, such as a personal identification document, for example a passport or driver's license. Details of the operational constituents of the video components of the exemplary image recognition bezel assembly for data reception 500 are best presented in the cross sectional illustration of FIG. 18. The advantages of the inclusion of a forward-extending hollow tongue 540 become apparent when considerations are provided for various camera 582, 584, 586 locations. The various camera 582, 584, 586 locations enable viewing and recording of images of various objects that have a thickness that is normally exceeding the span of the interior insertion/dispensing slot 528.

The image recognition bezel assembly for data reception 500 can include a hood located camera 582, assembled to an upper portion of the outwardly projecting casing 510, such as the hood 526; a tongue upper surface mounted camera 584 assembled to tongue top surface 544 of the forward-extending hollow tongue 540; and/or a tongue lower surface mounted camera 586 assembled to a tongue bottom surface 545 of the forward-extending hollow tongue 540. Examples of the various configurations are illustrated throughout FIGS. 17-22. The image recognition bezel assembly for data reception 500 includes a video image controller assembly 572. The video image controller assembly 572 includes circuitry for operating the various cameras 582, 584, 586; obtaining and recording images provided by any or all of the cameras 582, 584, 586; interpreting the recorded image(s), and communicating with the bill validator 230 or another processor that is integrated within the supporting transactional device 200. The circuitry includes a microprocessor 574, memory 576, and other electric components, such as capacitors, resistors, inductors, voltage regulators, diodes, and the like. Each camera 582, 584, 586 is provided in signal communication with the video image controller assembly 572 by a cable 583, 585. The video image controller assembly 572 is provided in signal communication with the bill validator 230 or another processor by a cable 578 and respective connector 579. The cable 578 and respective connector 579 can additionally provide operating electrical power to the video image controller assembly 572 and respective cameras 582, 584, 586.

Figure 17:
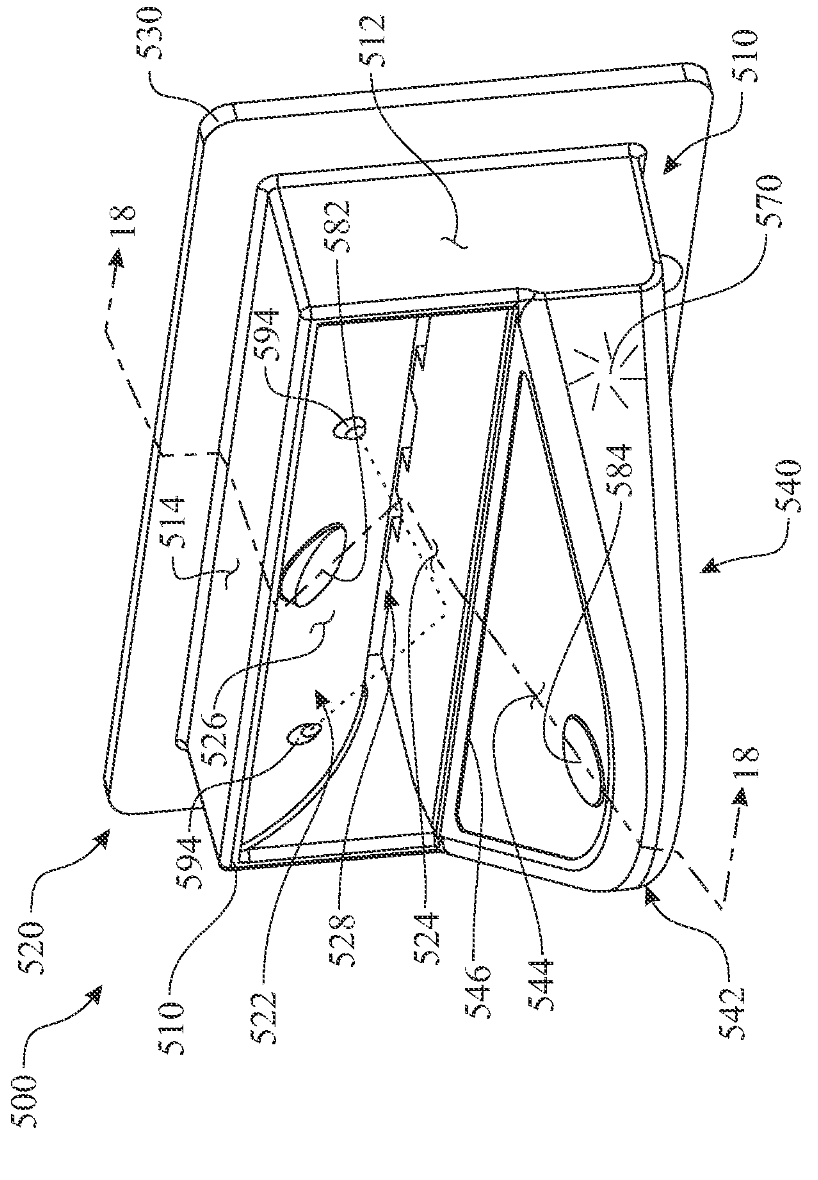
FIG. 17 presents an isometric view of a sixth embodiment of the present invention illustrating a image recognition bezel assembly for data reception comprising a pair of electronic image sensors or digital cameras incorporated into the bezel housing.
Figure 18:
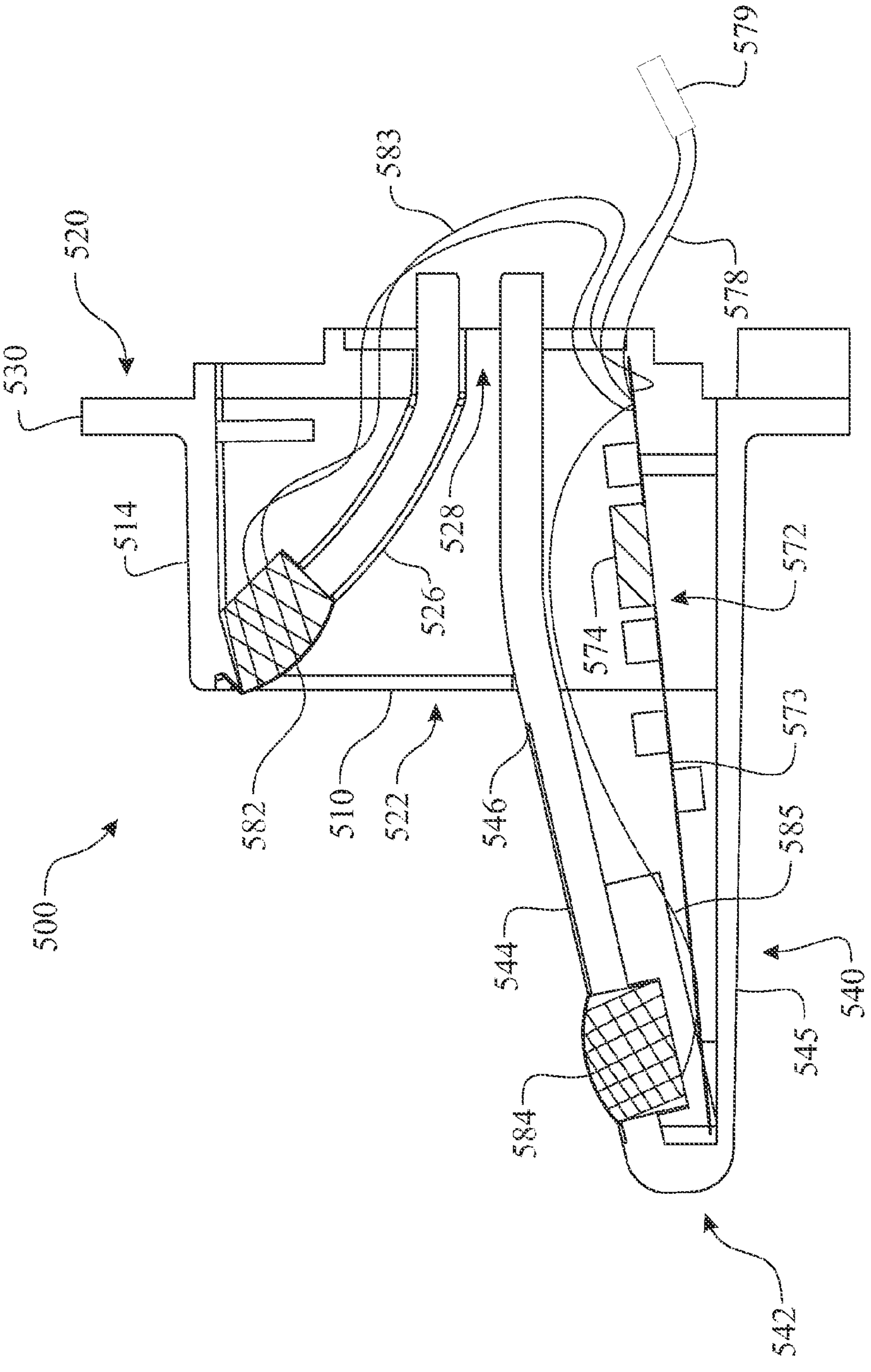
FIG. 18 presents a sectioned elevation view of the a image recognition bezel assembly for data reception of the sixth embodiment of the present invention, the section being taken along section line 18-18 of FIG. 17.

In a first configuration, the image recognition bezel assembly for data reception 500 includes one or more hood located cameras 582 installed in the hood 526 of the outwardly projecting casing 510 and one or more tongue upper surface mounted cameras 584 installed in the tongue top surface 544 of the forward-extending hollow tongue 540 as illustrated in FIGS. 17 and 18. This configuration enables the customer the flexibility to present an image to either camera 582, 584. The image recognition bezel assembly for data reception 500 can utilize one camera 582, 584 to identify a presence of an object while the second camera 582, 584 records an image of the presented object. In another operational arrangement, the pair of cameras 582, 584 can obtain an image of each side of the presented object. The exemplary embodiment introduces a pair of image registration lasers 594, which are used to aid in alignment of the 2D barcode or other image with the camera 582. The alignment system can alternatively or in combination, include a display, wherein the display presents an indexing box in conjunction with a live image obtained by the camera 582 to aid the user in aligning the 2-D barcode or other image into the desired registration location. In yet another embodiment, the system can utilize the bill validator 230 to position the ticket or item within the desired viewing location of the camera to more easily scan it.

Figure 19:
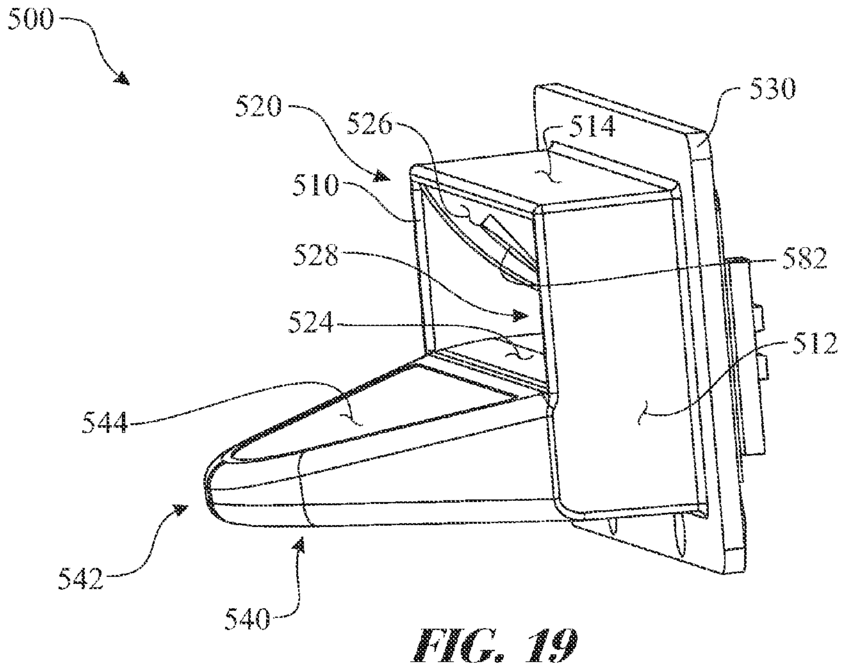
FIG. 19 presents an isometric view of an alternative version of the sixth embodiment of the present invention incorporating an electronic image sensor into a hood of the bezel housing.

In a second configuration, the image recognition bezel assembly for data reception 500 includes a hood located camera 582 installed in the hood 526 of the outwardly projecting casing 510 as illustrated in FIG. 19.

Figure 20:
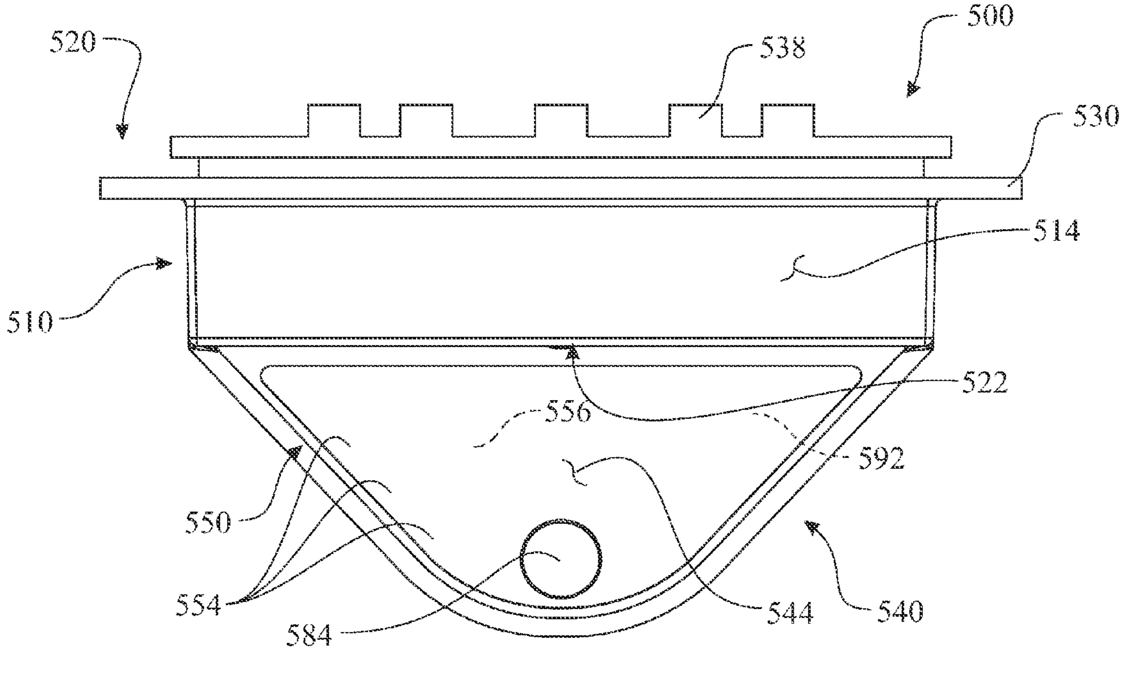
FIG. 20 presents a top plan view of another alternative version of the sixth embodiment of the present invention incorporating an electronic image sensor into an upper surface of a tongue of the bezel housing.
Figure 21:
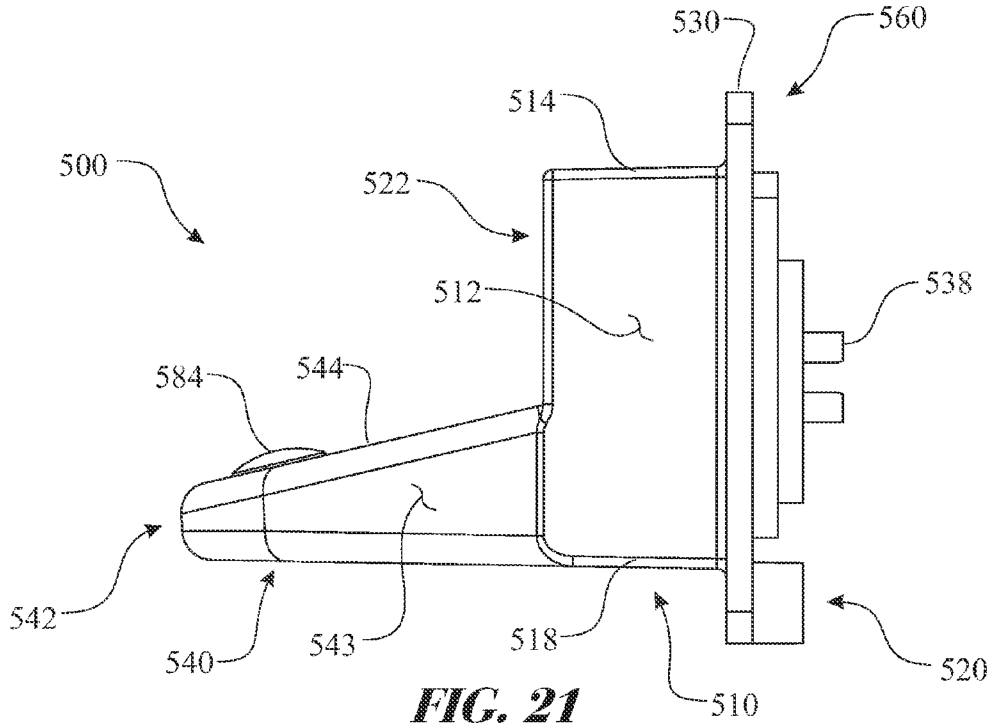
FIG. 21 presents a side elevation view of the alternative version of the sixth embodiment of the present invention incorporating the electronic image sensor into the upper surface of a tongue of the bezel housing.

In a third configuration, the image recognition bezel assembly for data reception 500 includes a tongue upper surface mounted camera 584 installed in the tongue top surface 544 of the forward-extending hollow tongue 540 as illustrated in FIGS. 20 and 21. The tongue upper surface mounted camera 584 (or using another integrated camera) introduces the ability to obtain and record an image of the user's face as a method of increasing security. The image recognition bezel assembly for data reception 500 can include an illumination source to emit a light, such as a flash) upon the user's facial region to provide sufficient lighting for the camera 582 to obtain a suitable image of the user's face.

Figure 22:
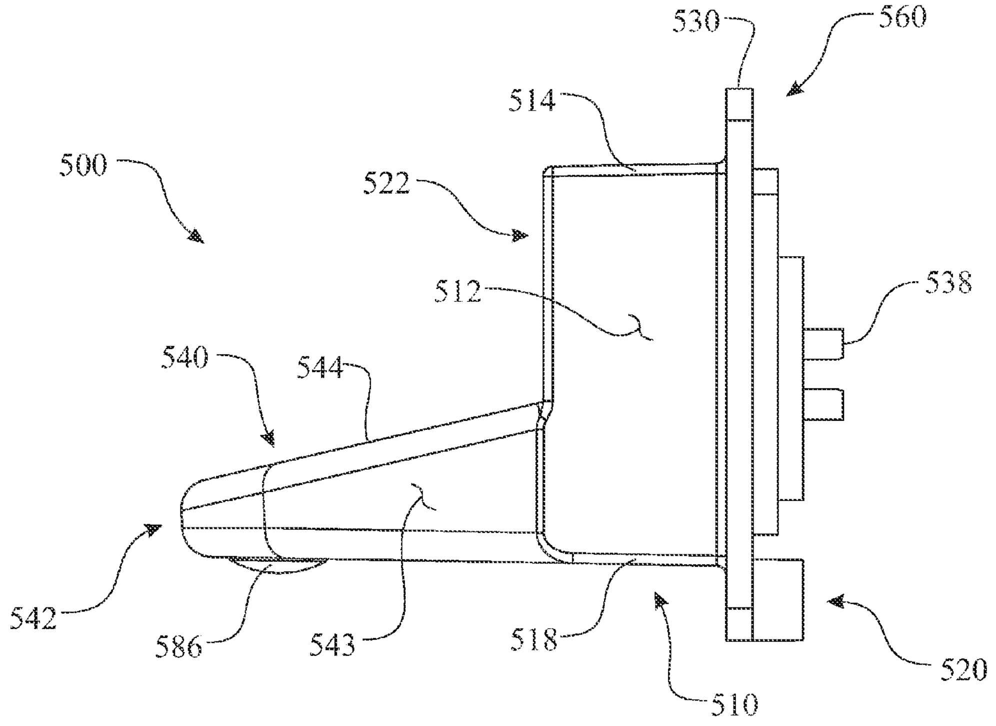
FIG. 22 presents a side elevation view of another alternative version of the sixth embodiment of the present invention incorporating an electronic image sensor into a lower surface of a tongue of the bezel housing.

In a fourth configuration, the image recognition bezel assembly for data reception 500 includes a tongue lower surface mounted camera 586 installed in the tongue lower surface 545 of the forward-extending hollow tongue 540 as illustrated in FIG. 22.

It is understood that the video image controller assembly 572 can be designed to accommodate any one or more, or all camera location configurations. The camera cabling 583, 585 can include connectors for ease of assembly to mating connectors assembled to the video image controller assembly 572.

The image recognition bezel assembly for data reception 500 can be configured in any of a variety of operational configurations, with several exemplary configurations being presented in FIGS. 23 through 30. Two basic exemplary configurations are presented in FIGS. 23 and 24. In these configurations, the image recognition bezel assembly for data reception 500 includes a camera (represented by the hood located camera 582) and a transmission interface 577. The transmission interface 577 can be wired communication interface, such as the cable 583 and cable 578 in conjunction with cable 579 or a wireless communication interface, such as the wireless communication module 150.

Figure 23:
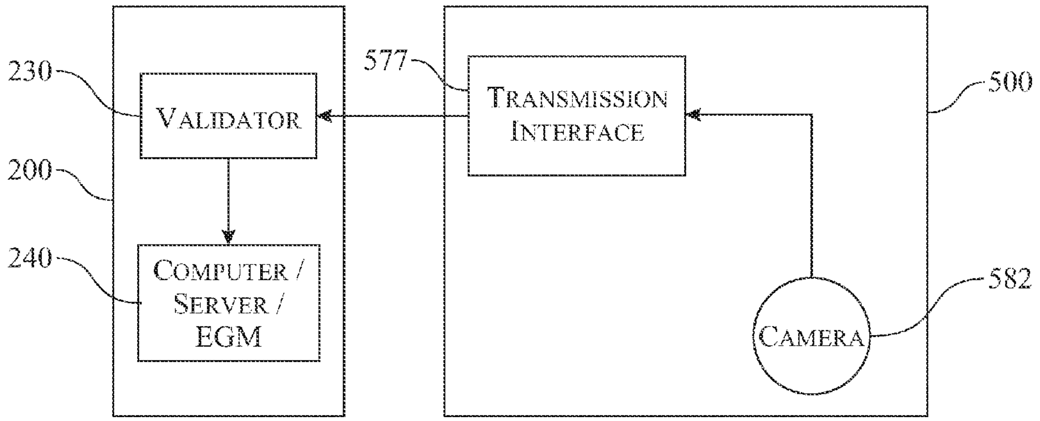
FIG. 23 presents a schematic diagram representing a first exemplary digital image recognition configuration, wherein the first exemplary configuration utilizes the bill validator as a processing unit for the digital image obtained by the camera.

In the first exemplary operational configuration presented in FIG. 23, the transmission interface 577 communicates with the bill validator 230. In this configuration, the bill validator 230 provides the functionality of a processing unit for the camera 582. In this operational configuration, the camera 582 is continuously scanning for a presence of a valid 2D barcode. When a 2D barcode or other acceptable image is presented to the camera 582, the image recognition bezel assembly for data reception 500 scans and decrypts the image. Upon a successful scan of the 2-D barcode or other image, the image recognition bezel assembly for data reception 500 emits an auditory and/or visual cue to inform the user that the 2-D barcode or other image has been successfully scanned and decrypted.

Figure 24:
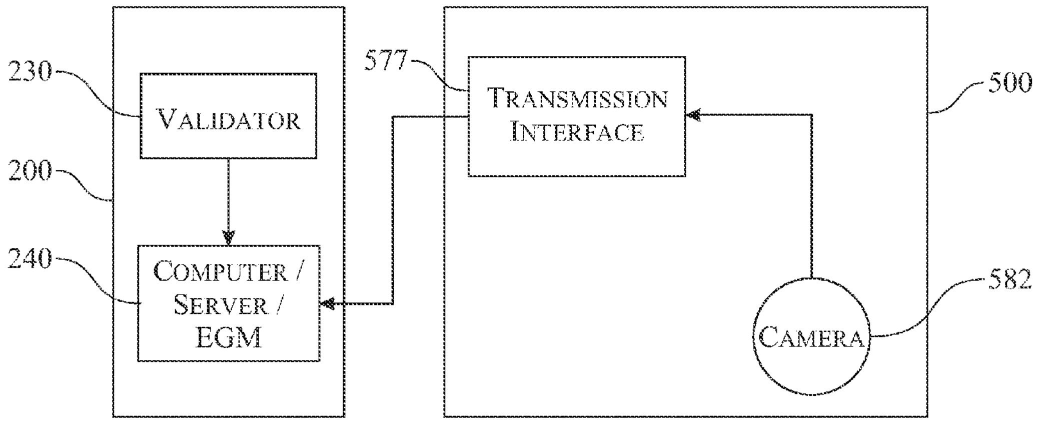
FIG. 24 presents a schematic diagram representing a second exemplary digital image recognition configuration, wherein the second exemplary configuration utilizes a transactional device computer as the processing unit for the digital image recognition configuration.

In the second exemplary operational configuration presented in FIG. 24, the transmission interface 577 communicates with the transactional device computer 240, the device server, or the electronic gaming machine processor. In this configuration, the transactional device computer 240, the device server, or the electronic gaming machine processor provides the functionality of a processing unit for the camera 582.

Figure 25:
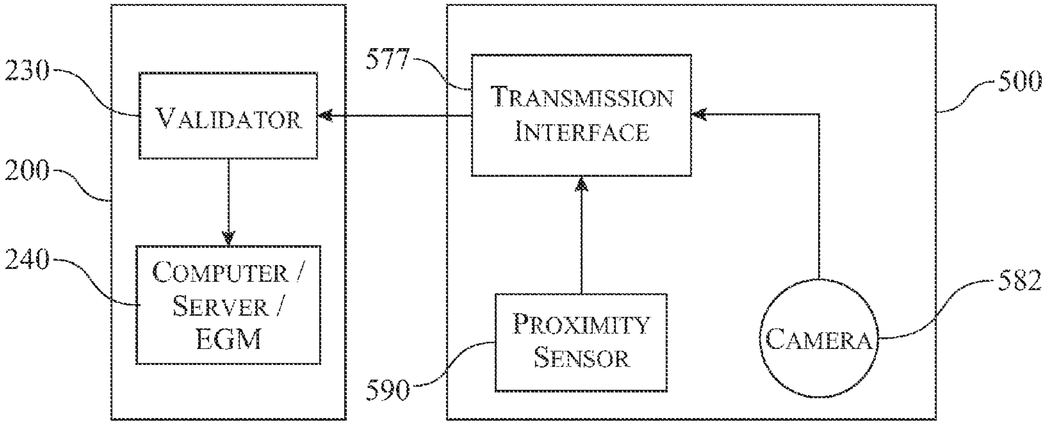
FIG. 25 presents a schematic diagram representing a third exemplary digital image recognition configuration, wherein the third exemplary configuration introduces a proximity sensor into the schematic introduced in FIG. 23.

In the third exemplary operational configuration presented in FIG. 25, the configuration is enhanced by integrating a proximity sensor 590 into the schematic presented in FIG. 23. The proximity sensor can be a proximity diode, an acoustic or sonar proximity sensor, a light or Infra-Red (IR) proximity sensor, a laser proximity sensor, a hall effect sensor, an inductive sensor, an ambient light sensor, and the like. The scanning process initiates when the proximity sensor 590 identifies when an object is placed in a reading position respective to the camera 582. In a condition where the proximity sensor 590 is not identifying an object within the viewing window of the camera 582, the image recognition bezel assembly for data reception 500 deactivates the camera 582. This enhancement reduces power consumption by the image recognition bezel assembly for data reception 500. This enhancement additionally reduces maintenance costs and increases longevity of the camera 582. Upon a successful scan of the 2-D barcode or other image, the image recognition bezel assembly for data reception 500 emits an auditory and/or visual cue to inform the user that the 2-D barcode or other image has been successfully scanned and decrypted.

Figure 26:
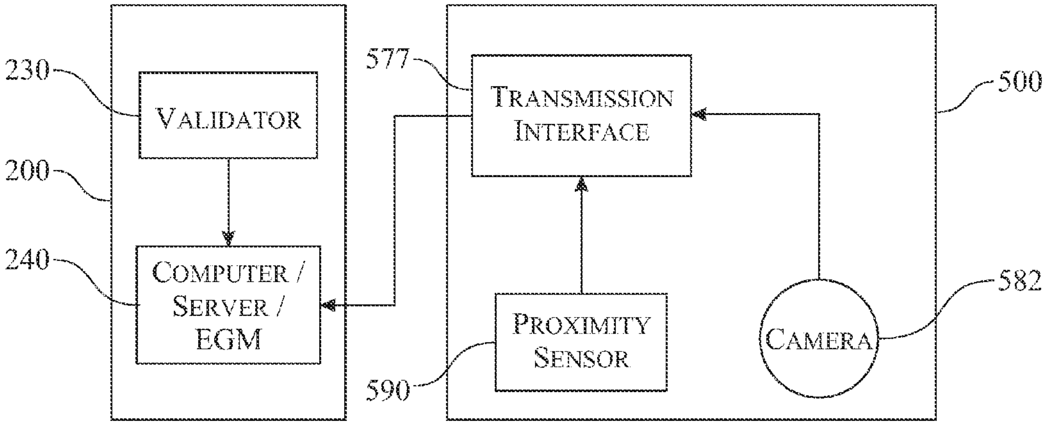
FIG. 26 presents a schematic diagram representing a fourth exemplary digital image recognition configuration, wherein the fourth exemplary configuration introduces a proximity sensor into the schematic introduced in FIG. 24.

In the fourth exemplary operational configuration presented in FIG. 26, the configuration is enhanced by integrating a proximity sensor 590 into the schematic presented in FIG. 25. The proximity sensor identifies when an object is placed in a reading position respective to the camera 582. This enhancement reduces power consumption by the image recognition bezel assembly for data reception 500. This enhancement additionally reduces maintenance costs and increases longevity of the camera 582.

Figure 27:
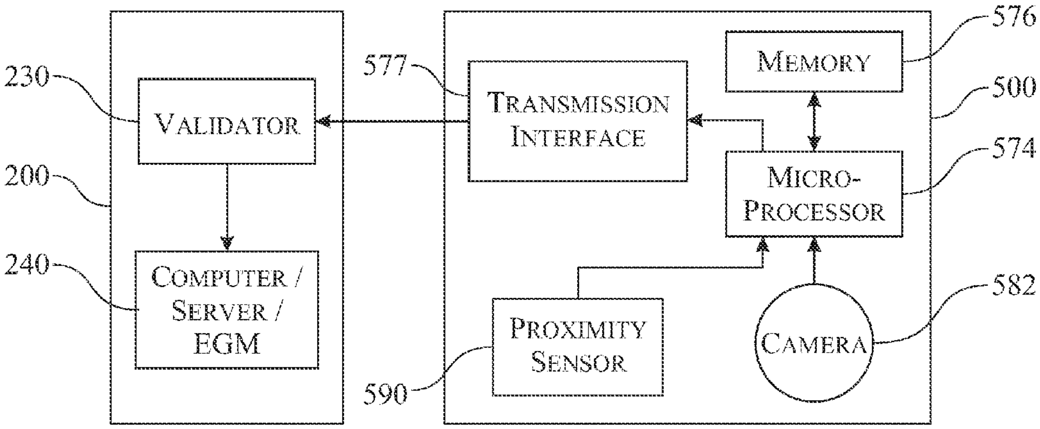
FIG. 27 presents a schematic diagram representing a fifth exemplary digital image recognition configuration, wherein the fifth exemplary configuration introduces an integrated microprocessor and respective digital memory into the schematic introduced in FIG. 25.

In the fifth exemplary operational configuration presented in FIG. 27, the configuration is additionally enhanced by integrating a microprocessor 574 and a digital memory device 576 into the schematic presented in FIG. 25. This configuration utilizes the integrated microprocessor 574 and digital memory device 576 to process the digital images obtained by the camera 582. This configuration transmits basic information from the microprocessor 574 and digital memory device 576 to the bill validator 230, wherein the bill validator 230 utilizes the basic information provided by the microprocessor 574 and digital memory device 576 to operate the transactional device 200 accordingly.

Figure 28:
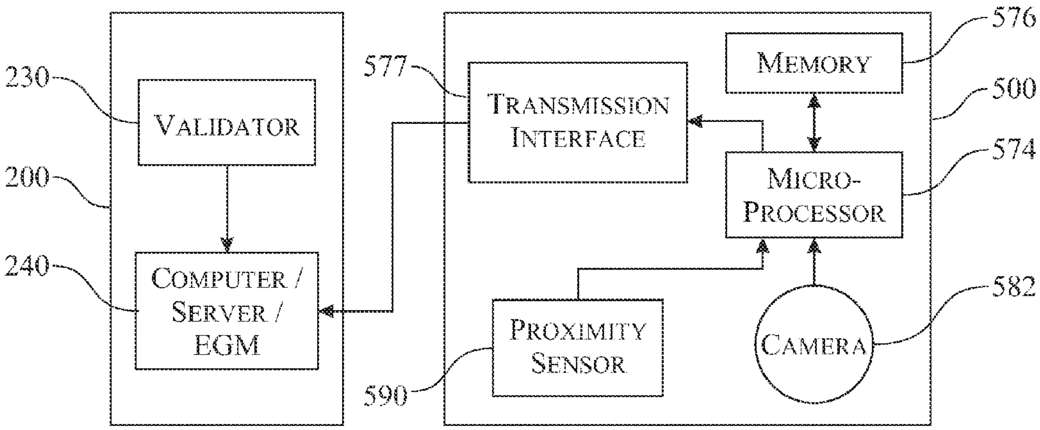
FIG. 28 presents a schematic diagram representing a sixth exemplary digital image recognition configuration, wherein the sixth exemplary configuration introduces an integrated microprocessor and respective digital memory into the schematic introduced in FIG. 26.

In the sixth exemplary operational configuration presented in FIG. 28, the configuration is additionally enhanced by integrating a microprocessor 574 and a digital memory device 576 into the schematic presented in FIG. 26. This configuration utilizes the integrated microprocessor 574 and digital memory device 576 to process the digital images obtained by the camera 582. This configuration transmits basic information from the microprocessor 574 and digital memory device 576 to the transactional device computer 240, the device server, or the electronic gaming machine processor, wherein the transactional device computer 240, the device server, or the electronic gaming machine processor utilizes the basic information provided by the microprocessor 574 and digital memory device 576 to operate the transactional device 200 accordingly.

Figure 29:
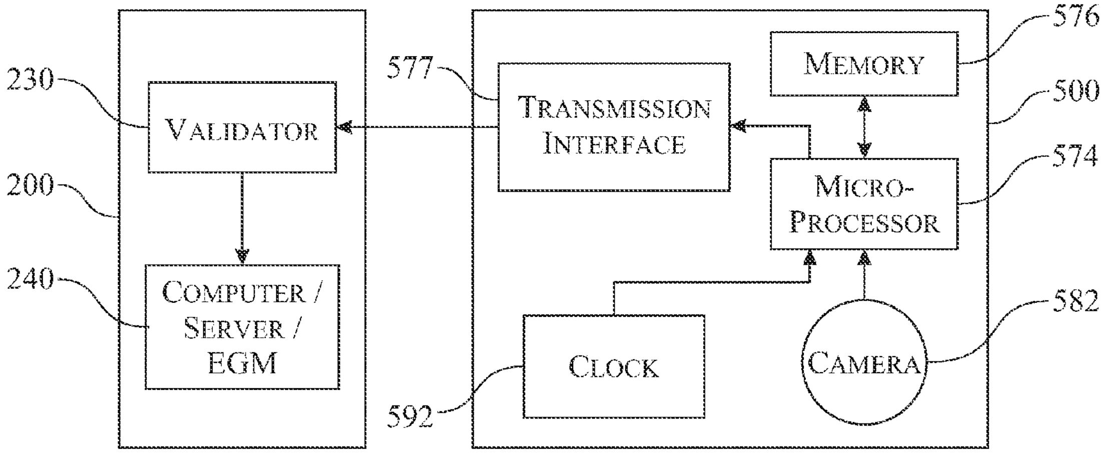
FIG. 29 presents a schematic diagram representing a seventh exemplary digital image recognition configuration, wherein the seventh exemplary configuration replaces the proximity sensor with a clocking controller within the schematic introduced in FIG. 27.

In the seventh exemplary operational configuration presented in FIG. 29, the configuration is modified by replacing the proximity sensor 590 of the schematic presented in FIG. 27 with a clocking circuit 592. The clocking circuit 592 can provide any of a variety of functions to the image recognition bezel assembly for data reception 500. The clocking circuit 592 can be used to control the timing of a pulse for obtaining images by the camera 582. The clocking circuit 592 can be used to identify a time in which an image is obtained by the camera 582. The integrated clocking circuit 592 can be utilized for any suitable function known by those skilled in the art. This configuration transmits basic information from the microprocessor 574 and digital memory device 576 to the bill validator 230, wherein the bill validator 230 utilizes the basic information provided by the microprocessor 574 and digital memory device 576 to operate the transactional device 200 accordingly.

Figure 30:
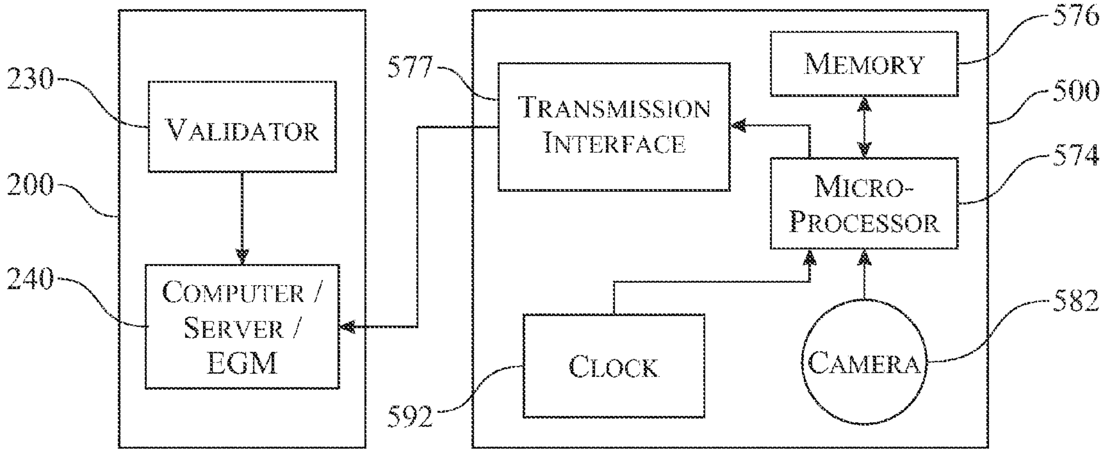
FIG. 30 presents a schematic diagram representing an eighth exemplary digital image recognition configuration, wherein the eighth exemplary configuration replaces the proximity sensor with a clocking controller within the schematic introduced in FIG. 28.

In the eighth exemplary operational configuration presented in FIG. 30, the configuration is modified by replacing the proximity sensor 590 of the schematic presented in FIG. 28 with a clocking circuit 592, as described above. This configuration transmits basic information from the microprocessor 574 and digital memory device 576 to the transactional device computer 240, the device server, or the electronic gaming machine processor, wherein the transactional device computer 240, the device server, or the electronic gaming machine processor utilizes the basic information provided by the microprocessor 574 and digital memory device 576 to operate the transactional device 200 accordingly.

It is understood that the video image controller assembly 572 can be placed in communication with a remote service provider enabling management of the image recognition bezel assembly for data reception 500, the ability to obtain operational metrics, modify or upgrade software remotely, modify or upgrade firmware remotely, and the like.

Figure 31:
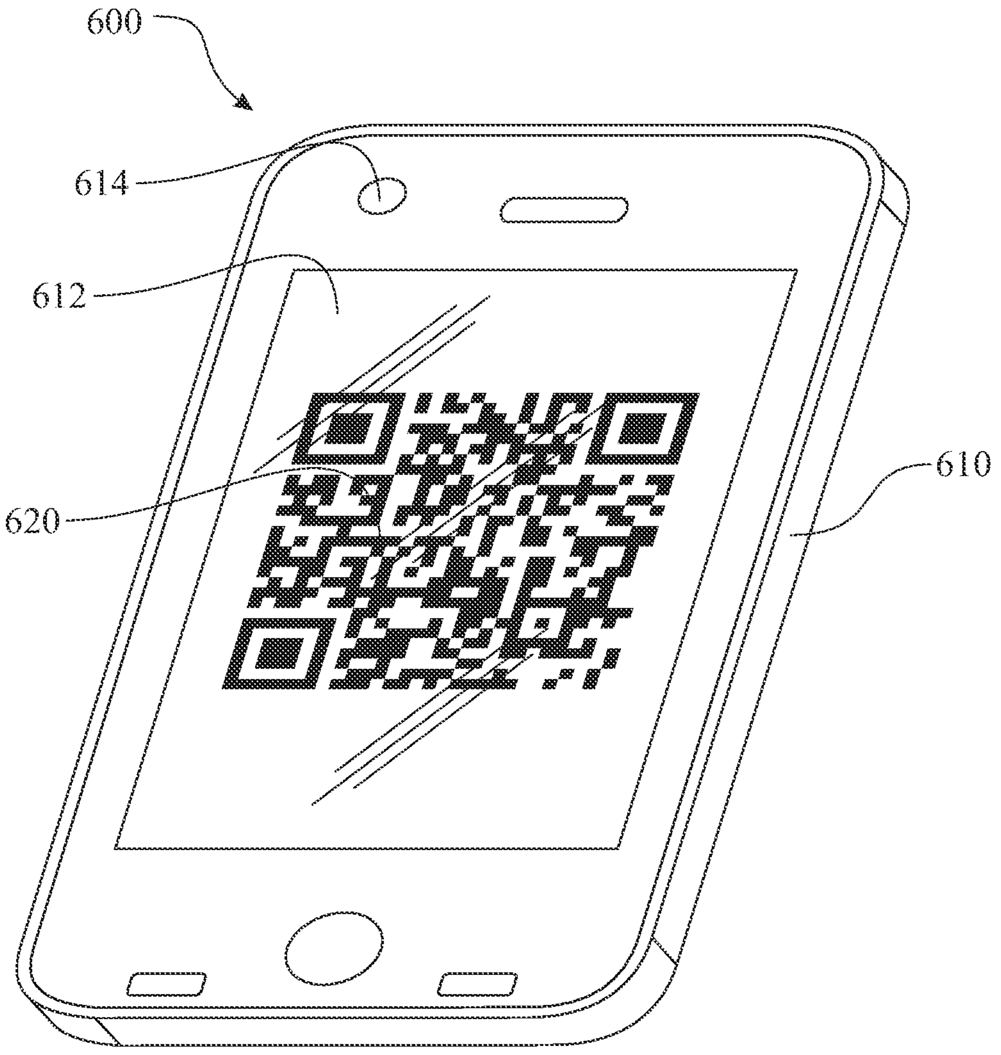
FIG. 31 presents an isometric view of an exemplary smart phone displaying an image of an exemplary Quick Response (QR) code 2D barcode.

The image recognition bezel assembly for data reception 500 provides for a variety of applications. One exemplary function of the cameras 582, 584, 586 would be for scanning and decoding two-dimensional (2D) barcodes, such as the 2D barcode image 620 displayed upon a smart phone 600 as illustrated in FIG. 31. The exemplary smart phone 600 includes a smart phone display 612 supported by a smart phone housing 610. The exemplary smart phone 600 also includes a smart phone camera 614, also supported by the smart phone housing 610. The exemplary 2D barcode image 620 is presented in a Quick Response (QR) code format. Although the exemplary embodiment presents a common Quick Response (QR) code format, it is understood that the image recognition bezel assembly for data reception 500 can be used to read any 2D barcode format, including PDF417, QR code, MaxiCode, EZcode, matrix codes, and any other industry standard code.

It is understood that the system can include an illumination source 570 (FIG. 17) to emit a light upon the 2-D barcode or image to provide sufficient lighting for the camera 582 to properly read the 2-D barcode or image. The illumination source 570 would be similar in scope and implementation to either of the indicator lights 170, 172 introduced in FIG. 7.

The bezel assembly for data reception 500 can be enhanced by integrating optional additional features. A first optional feature is a short-range wireless communication module 550 introduced in FIG. 20. The short-range wireless communication module 550 includes the same elements and same benefits as the short-range wireless communication module 150 previously described herein. The combination of the cameras 582, 584, 586 and the short-range wireless communication module 550 enables additional benefits to the consumer and the service provider. The combination of the cameras 582, 584, 586 and the short-range wireless communication module 550 can be used to enhance security, ensuring the consumer is the registered party with the wireless communicating device 250 by utilizing the cameras 582, 584, 586 to record images of individuals associated with any wireless communication between the bezel assembly for data reception 500 and the wireless communicating device 250.

A second optional feature is a manual input assembly introduced in FIG. 20, represented by a series of manual input devices 554 can be integral to the bezel assembly for data reception 500 as previously described with respect to the bezel assembly for data reception 300. The manual input assembly would comprise the same elements as the manual input assembly 350 and provide the consumer with the same benefits as previously presented.

A third optional feature would be a biometric reader, similar to the fingerprint reader 464 previously presented. The fingerprint reader 464 is incorporated into the embodiment by reference.

The various exemplary schematics presented in FIGS. 23 through 30 are directed towards the integration of a camera 582, 584, 586. It is understood that the same schematic arrangements can be utilized in conjunction with the manual input assembly 350 or fingerprint or other biometric reader 464. It is also understood that the same schematic arrangements can be utilized in conjunction with or modified for any other interface integrated within the bezel assembly 100, 102, 104, 300, 400, 500.

Figure 32:
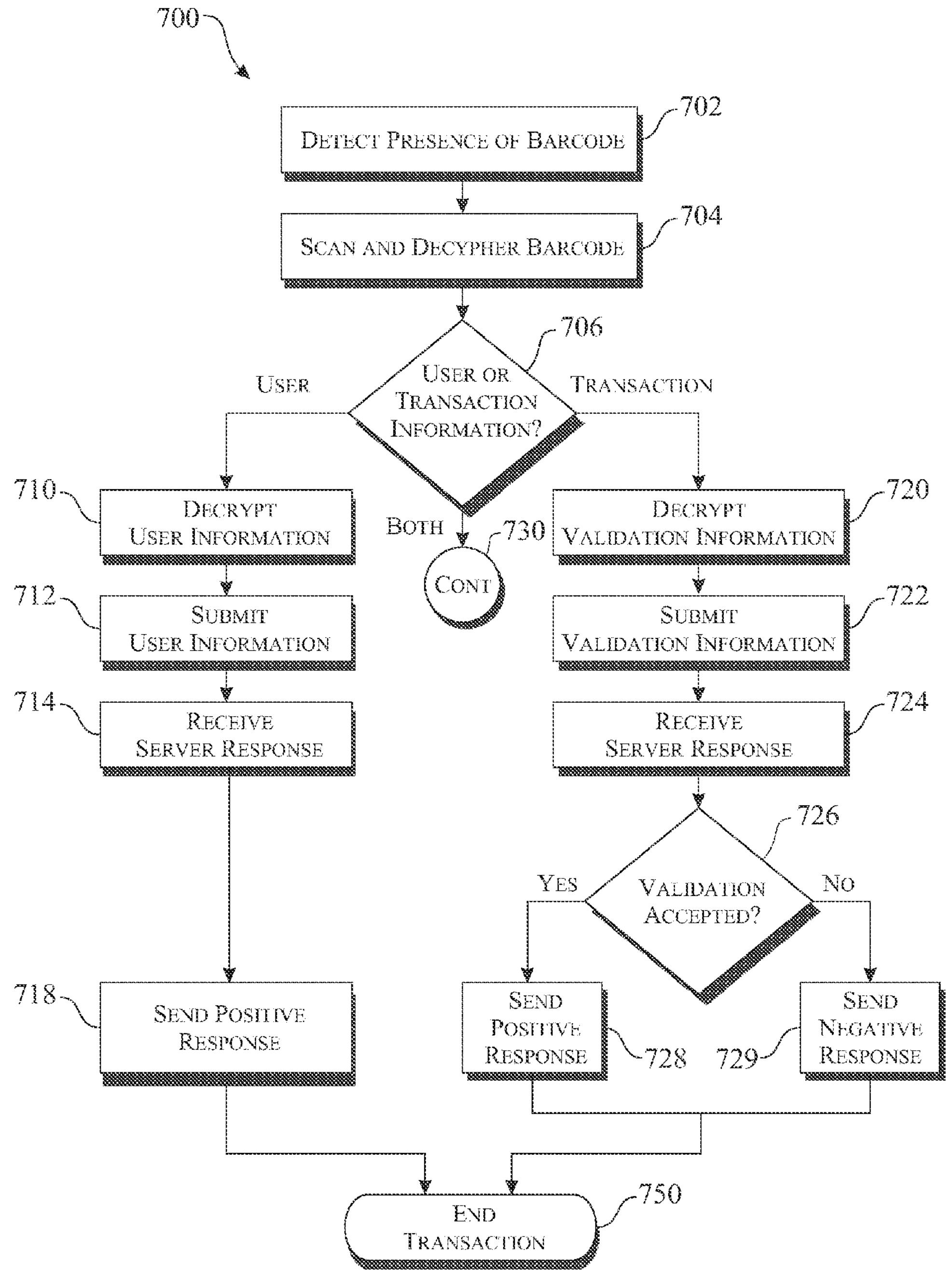
FIG. 32 presents a first portion of an exemplary barcode processing flow diagram, the flow diagram portion including processes for either a user information based barcode or a transaction based barcode.
Figure 33:
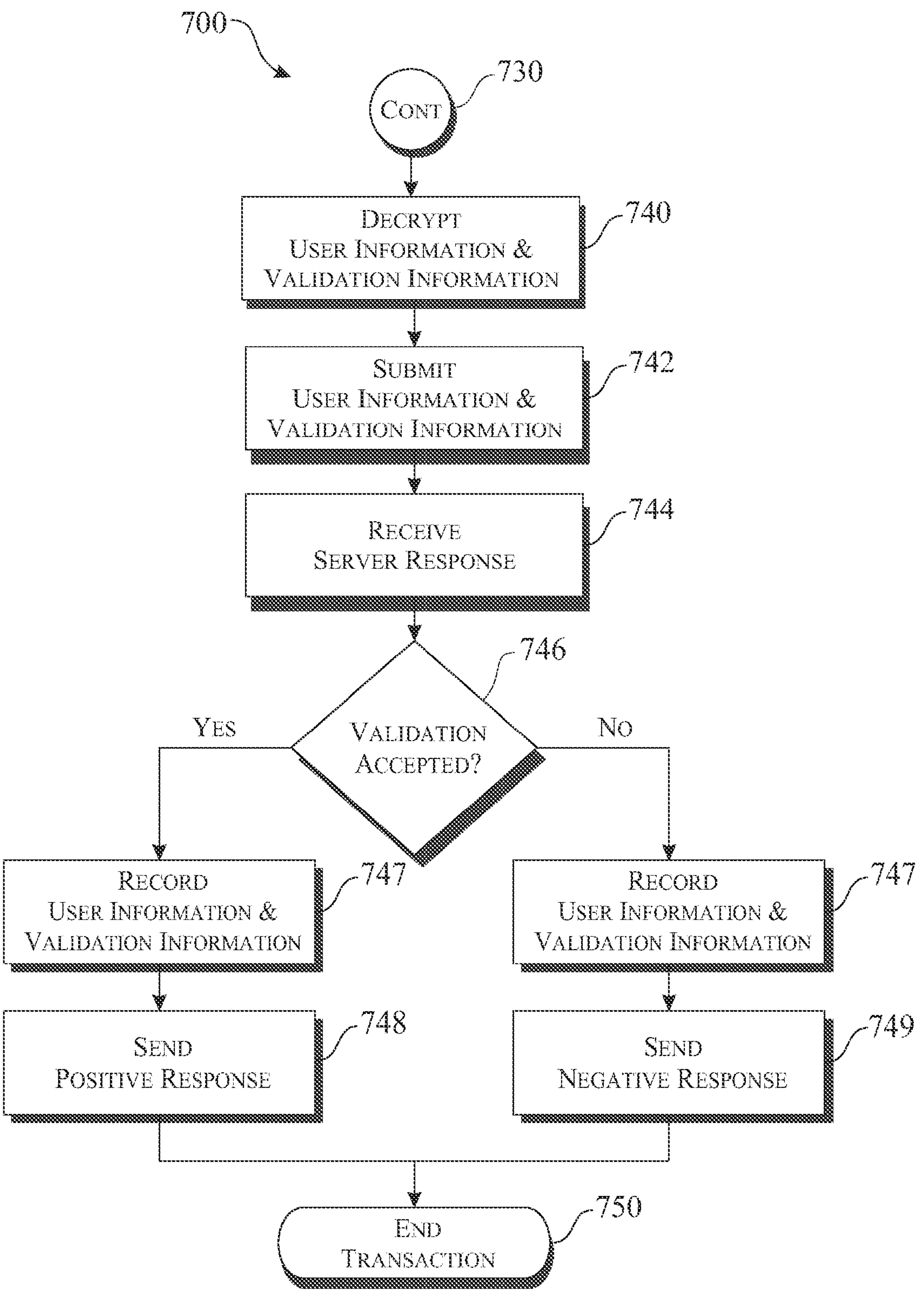
FIG. 33 presents a second portion of the exemplary barcode processing flow diagram introduced in FIG. 32, the flow diagram portion including processes for both the user information based barcode and the transaction based barcode.

An exemplary barcode processing flow diagram 700 is presented in FIGS. 32 and 33. The barcode processing flow diagram 700 describes the steps for scanning and utilizing a barcode presented to the image recognition bezel assembly for data reception 500. The process initializes when the image recognition bezel assembly for data reception 500 detects the presence of an object placed within a suitable proximity of the camera(s) 582, 584, 586 of the image recognition bezel assembly for data reception 500 (block 702). The object can be detected by any proximity sensing device 590, including a proximity diode, an acoustic proximity sensor, a light or Infra-Red (IR) proximity sensor, a laser proximity sensor, and the like. Although the exemplary embodiment is presented in a form factor of a smart phone 600, it is understood that the object can be a paper having a barcode printed thereon, a computer tablet, a portable data assistant (PDA), a personal identification document, and the like. Upon identification of an object within a scanning boundary of the camera(s) 582, 584, 586, the image recognition bezel assembly for data reception 500 scans and deciphers the barcode (block 704). The system determines if the information presented by the barcode is user-based information, transaction based information, or both (decision step 706). The system follows the respective path based upon the outcome of decision step 706.

Following the user based information path, the process decrypts the user-based information (block 710). Once decrypted, the decrypted user based information is forwarded or submitted to a server or other processing and database management system (block 712) used in conjunction with the transactional device 200. Upon successful recordation of the user-based information, the server or other processing and database management system returns a positive indicator to the bezel assembly for data reception 100 (block 714). The bezel assembly for data reception 100 receives the positive indicator from the server or other processing and database management system and subsequently presents a positive response to the consumer (block 718). The positive response can be presented to the user via any acceptable user interface, including illumination of an indicator light 170, 172, a display, an audible identifier, and the like, or any combination thereof. Once completed, the bezel assembly for data reception 100 terminates the transaction (block 750).

Following the transaction based information path, the process decrypts the validation information submitted by the barcode, user, system, or any combination thereof (block 720). Once decrypted, the decrypted validation information is forwarded or submitted to the server or other processing and database management system (block 722) used in conjunction with the transactional device 200. Upon successful recordation of the validation information, the server or other processing and database management system investigates the validation information to determine if the validation information is acceptable. The server or other processing and database management system utilizes any known or inventive process to determine if the validation information is acceptable. Upon a conclusive verdict regarding the acceptability of the validation information, the server or other processing and database management system informs the bill validator 230 or the bezel assembly for data reception 100 of the determined ruling (acceptance or rejection) of the submitted validation information (block 724). The determined ruling regarding the validation information is received and interpreted by the bill validator 230 or the bezel assembly for data reception 100 in a validation acceptance decision step (block 726). In a condition where the validation decision step 726 determines that the validation information is acceptable, the process continues by presenting a positive response to both the consumer and the processor 240 of the transactional device (block 728). The positive response to the processor 240 of the transactional device generally comprises a credit to the machine. In a condition where the validation decision step 726 determines that the validation information is not acceptable, the process continues by presenting a negative response to the consumer (block 729). The transaction process is terminated (block 750) upon notification of the validation response to the consumer.

The third potential path results from a scanned barcode comprising both user-based information and transaction based information. The third path is represented by a continuation block 730 introduced in FIG. 32 with details being presented in the continuation process flow section presented in FIG. 33. The third potential path blends the user based information path and the transaction based information path. The third potential path initiates with a step of decrypting the information provided by the barcode, including validation information and user information (block 740). Once decrypted, the decrypted user information and validation information is forwarded or submitted to the server or other processing and database management system (block 742) used in conjunction with the transactional device 200. Upon successful recordation of the user information and validation information, the server or other processing and database management system records the user information and investigates the validation information to determine if the validation information is acceptable. The server or other processing and database management system utilizes any known or inventive process to determine if the validation information is acceptable. Upon a conclusive verdict regarding the acceptability of the validation information, the server or other processing and database management system informs the bill validator 230 or the bezel assembly for data reception 100 of the determined ruling (acceptance or rejection) of the submitted validation information (block 744). The determined ruling regarding the validation information is received and interpreted by the bezel assembly for data reception 100 in a validation acceptance decision step (block 746). The validation information is reviewed to determine if the validation information is acceptable (decision step 746). Independent of the results of the validation decision step 746, the process records the validation information and user information (block 747). In a condition where the validation decision step 746 determines that the validation information is acceptable, the process continues by presenting a positive response to both the consumer and to the processor of the transactional device (block 748). In a condition where the validation decision step 746 determines that the validation information is not acceptable, the process continues by presenting a negative response to the consumer (block 749). The transaction process is terminated (block 750) upon notification of the validation response to the consumer.

In use, the image recognition bezel assembly for data reception 500 provides several user applications and/or benefits, including:

a. Barcode encryption: The image recognition bezel assembly for data reception 500 can utilize additional digits encoded within the barcode. Currently a ticket transaction at a casino involves printing an eighteen (18) digit validation number in the form of an interleaved 2 of 5 barcode, which is validated at a system level. A two-dimensional (2D) barcode allows for an extra set of security digits that will allow the machine to encrypt using a random number that dynamically updates and is used at that moment. With a set up user password (such as a pre-enrolled or pre-assigned password), the ticket information can be encrypted or decrypted allowing only a selected user to use the funds stored with the validation number on the 2D barcode.

b. User tracking: The two-dimensional (2D) barcode enables encoding of additional information compared to the interleaved 2 of 5 barcode, providing more information in each 2D barcode scan. The 2D barcode can include encoded user information, including the consumer's name, address, phone number, rewards number, and the like. This would allow a new level of user tracking not currently used in a linear barcode implementation.

c. Marketing research: The usage of the two-dimensional (2D) barcode with additional data carrying capabilities also enables encoding of additional information to provide tracking and feature tracking. By writing in counters, the system can track how many times a specific customer used a feature. The system can monitor which kiosks were used by a specific customer. These options provide enhanced metrics that are not available with the current technology. This information can also be used for targeted marketing depending on where the specific customer has been and what tracking metrics have been activated.

d. Restrictions: Currently in the gaming market there are certain restrictions that can be implemented to stop a player from playing, including loss limits, opt out forms, or a condition where the specific individual is suspended from gambling at a property. The extra identifying information of the two-dimensional (2D) barcode can be used to include information to track an individual as he enters a casino, or establishment. When certain criteria are met, funds or accounts related to the individual can be frozen until the establishment or authorities can identify the individual.

e. Photographic Image Data: In addition to utilizing the camera and data processing of the camera image for 2D barcodes, the camera and data processing capabilities may be used to take a photograph of a user of the transactional device for identification purposes. This may require a second camera on the bezel directed toward the user's face. A correspondence can be made between the picture of the user and the 2D barcode. Because of the nature of the barcode, extra hashing data can be included within the 2D barcode data to facilitate quickly organizing and retrieving picture information. The inclusion of one or more cameras further enables the device to obtain and record an image of the user, thus enhancing security. The image can merge the scan of the 2-D barcode and the photograph of the user into a single image.

f. Account Information: The additional data availability provided by the two-dimensional (2D) barcode can be used to include account information. Financial accounts are adapting to technology advances. A smart phone, tablet, personal data assistant (PDA), and the like can now display the two-dimensional (2D) barcode which can be read by the scanner, and linked to a person's account involving new technologies such as a mobile wallet or ewallet, a mobile wager wallet, a credit card system, and the like.

g. Ticket In-Ticket Out (TITO) replacement: The additional data availability provided by the two-dimensional (2D) barcode can be used to include additional information compared to the current Ticket In-Ticket Out (TITO) technology. The current Ticket In-Ticket Out (TITO) technology utilizes 18 digit interleaved 2 of 5 barcode to store validation numbers. The two-dimensional (2D) barcodes can store the same information in a smaller footprint, and it can store more information than currently available.

h. Promotional Advertising: The additional data availability provided by the two-dimensional (2D) barcode can be used to include marketing or promotional information. Smart phones, tablets, and other devices integrating a camera and a processor allow an individual to take a picture of a 2D barcode on a consumer-information display (such as a billboard, sign, digital display, printed material, marketing promotional material, or the like) and present it to the 2D Barcode reader on the bezel assembly 500 to trigger certain offers. Alternatively, the image recognition bezel assembly for data reception 500 can read a two-dimensional (2D) barcode off the display of the mobile device and present a respective, correlated, or corresponding deciphered image on a screen of the transactional device 200.

It is understood that the image recognition bezel assembly for data reception 500 can include other features that were previously introduced herein. The image recognition bezel assembly for data reception 500 can include the wireless communication module 150 introduced in the bezel assembly for data reception 100. The image recognition bezel assembly for data reception 500 can include the manual input assembly 350 introduced in the manual entry bezel assembly for data reception 300. The image recognition bezel assembly for data reception 500 can include the biometric authentication assembly 460 introduced in the biometric registering bezel assembly for data reception 400.

In summary, the bezel assembly for data reception 100 of the present invention provides a convenient means to retrofit transactional devices that do not include wireless communication; provides an efficient means to include wireless communication technology in a newly designed transactional device; provides improved wireless connectivity through the positioning of the wireless communication module 150 within the horizontally protruding tongue; provides an intuitive, single pay entry point; facilitates correct positioning by the consumer of the mobile device, as the horizontal tongue designates the exact location to be touched or near where the mobile device should be positioned; and prevents the consumer from attempting to make both a paper note transaction and a wireless transaction simultaneously. Additionally, the bezel assembly for data reception 100 of the present invention has been shown to be adaptable to a variety of transactional device cabinets 210. Various form factors have been presented such as a one-part housing 160 (with a tongue 140 that can fit within the bill validator window and allow the door to freely open over the protruding tongue 140) and a two-part housing 160 (with a tongue 140 that is attached to the cabinet door 212). A variety of variations have also been disclosed (such as a manual input assembly, a biometric authentication assembly, and a image recognition assembly), which may be used in combination with the exterior form factor of the bezel design herein disclosed, with or without the wireless communication module 150. Though the bezel assembly for data reception 100 has been generally described for use in the gaming industry, it is also advantageous for usage in retail, transportation, service payment, and vending industries.

It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A bezel assembly for use in a transactional device having a bill validator with a document acceptance slot and having a door with a validator window, said bezel assembly comprising:

a bezel housing comprising, in combination:

a front portion including a casing having an upper portion and a lower portion, wherein the casing is configured with an insertion/dispensing slot through which notes are received and including a protrusion projecting forwardly from the lower portion of said casing proximate to said insertion/dispensing slot; wherein a top surface of said protrusion and an interior surface of said casing form a continuous runway; and a back plate attached to said front portion and configured to be connectable to said transactional device;

wherein said top surface of said protrusion is configured having one of:

the top surface extending distally from said casing, or a horizontally arranged said top surface when said casing is installed onto said transactional device;

a short-range wireless communication module in the bezel housing and positioned to connectively communicate with a mobile device wherein communication is enabled along an area aligned with the protrusion and the insertion/dispensing slot; and a processor integral to the bezel assembly that controls operation of the bezel assembly including interfacing with the bill validator wherein transactional information received by the processor from the mobile device is presented to the bill validator and passed to the transactional device to provide credit on the transactional device.

2. The bezel assembly as recited in claim 1, wherein said top surface slopes downward as said top surface extends distally from said casing.

3. The bezel assembly as recited in claim 1, wherein said top surface extends outward from said casing horizontally when said casing is installed onto said transactional device.

4. The bezel assembly as recited in claim 1, said casing and said protrusion are manufactured as separate elements and subsequently assembled to one another.

5. The bezel assembly as recited in claim 1, further comprising a manual input assembly integral to said bezel housing front portion, said manual input assembly comprising:

a microcontroller, at least one manual entry device in signal communication with said microcontroller, and a communication interface providing signal communication between said microcontroller and said bill validator.

6. The at least one manual entry device of claim 5 wherein said at least one manual entry device includes at least one of:

engageable mechanical switches, capacitive switches, a keypad, a tactile touchpad, and a touchscreen.

7. The bezel assembly as recited in claim 5, wherein said at least one manual entry device is integral to said protrusion.

8. The bezel assembly as recited in claim 1, further comprising a biometric authentication assembly comprising a biometric reader, wherein said biometric authentication assembly is carried by said bezel housing, wherein said biometric reader is integral to said bezel housing at a location enabling access by a customer during use.

9. The bezel assembly as recited in claim 1, further comprising a digital image acquisition system including at least one camera, said at least one camera is carried by said casing.

10. The bezel assembly as recited in claim 1, further comprises at least one indicator light, wherein said at least one indicator light is located enabling a customer to view light emitted from said at least one indicator light during use.

11. A bezel assembly for use in a transactional device having a bill validator with a document acceptance slot and having a door with a validator window, said bezel assembly comprising:

a bezel housing comprising, in combination:

a front portion including a casing having an upper portion and a lower portion, wherein the casing is configured with an insertion/dispensing slot through which documents are received and including a protrusion projecting forwardly from the lower portion of said casing proximate to said insertion/dispensing slot;

wherein a top surface of said protrusion and an interior surface of said casing form a continuous runway; and a back plate attached to said front portion and configured to be connectable to said transactional device; and a short-range wireless communication module comprising a receiver, wherein said receiver is integral to a hollow portion within said protrusion and positioned to connectively communicate with a mobile device wherein communication is enabled along the area aligned with the protrusion and the insertion/dispensing slot; and a processor integral to the bezel assembly that controls operation of the bezel assembly including interfacing with the bill validator wherein transactional information received by the processor from the mobile device is presented to the bill validator and passed to the transactional device to provide credit on the transactional device.

12. The bezel assembly as recited in claim 11, wherein said top surface slopes downward as said top surface extends distally from said casing.

13. The bezel assembly as recited in claim 11, wherein said top surface extends outward from said casing horizontally when said casing is installed onto said transactional device.

14. The bezel assembly as recited in claim 11, further comprising a manual input assembly integral to said bezel housing front portion, said manual input assembly comprising:

a microcontroller, at least one manual entry device in signal communication with said microcontroller, and a communication interface providing signal communication between said microcontroller and said bill validator.

15. The at least one manual entry device of claim 14 wherein said at least one manual entry device includes at least one of:

engageable mechanical switches, capacitive switches, a keypad, a tactile touchpad, and a touchscreen.

16. The bezel assembly as recited in claim 14, wherein said at least one manual entry device is integral to said protrusion.

17. The bezel assembly as recited in claim 11, further comprising a biometric authentication assembly comprising a biometric reader, wherein said biometric authentication assembly is carried by said bezel housing, wherein said biometric reader is integral to said bezel housing at a location enabling access by a customer during use.

18. The bezel assembly as recited in claim 11, further comprising a digital image acquisition system including at least one camera, said at least one camera is carried by said casing.

19. The bezel assembly as recited in claim 11, further comprises at least one indicator light, wherein said at least one indicator light is located enabling a customer to view light emitted from said at least one indicator light during use.

20. A bezel assembly for use in a transactional device having a bill validator with a document acceptance slot and having a door with a validator window, said bezel assembly comprising:

a bezel housing comprising, in combination:

a front portion including a casing having an upper portion and a lower portion, wherein the casing is configured with an insertion/dispensing slot through which documents are received and including a protrusion projecting forwardly from the lower portion of said casing proximate to said insertion/dispensing slot; wherein a top surface of said protrusion and an interior surface of said casing form a runway; said casing and said protrusion are manufactured as separate elements and subsequently assembled to one another; and a back plate attached to said front portion and configured to be connectable to said transactional device; and a short-range wireless communication module comprising a receiver, wherein said received is integral to a hollow portion within said protrusion and positioned to connectively communicate with a mobile device wherein communication is enabled along the area aligned with the protrusion and the insertion/dispensing slot; and a processor integral to the bezel assembly that controls operation of the bezel assembly including interfacing with the bill validator wherein transactional information received by the processor from the mobile device is presented to the bill validator and passed to the transactional device to provide credit on the transactional device.

21. The bezel assembly as recited in claim 20, wherein said top surface slopes downward as said top surface extends distally from said casing.

22. The bezel assembly as recited in claim 20, wherein said top surface extends outward from said casing horizontally when said casing is installed onto said transactional device.

23. The bezel assembly as recited in claim 20, further comprising a manual input assembly integral to said bezel housing front portion, said manual input assembly comprising:

a microcontroller, at least one manual entry device in signal communication with said microcontroller, and a communication interface providing signal communication between said microcontroller and said bill validator.

24. The at least one manual entry device of claim 23 wherein said at least one manual entry device includes at least one of:

engageable mechanical switches, capacitive switches, a keypad, a tactile touchpad, and a touchscreen.

25. The bezel assembly as recited in claim 23, wherein said at least one manual entry device is integral to said protrusion.

26. The bezel assembly as recited in claim 20, further comprising a biometric authentication assembly comprising a biometric reader, wherein said biometric authentication assembly is carried by said bezel housing, wherein said biometric reader is integral to said bezel housing at a location enabling access by a customer during use.

27. The bezel assembly as recited in claim 20, further comprising a digital image acquisition system including at least one camera, said at least one camera is carried by said casing.

28. The bezel assembly as recited in claim 20, further comprises at least one indicator light, wherein said at least one indicator light is located enabling a customer to view light emitted from said at least one indicator light during use.

* * * * *